(12) United States Patent
Suwald

(10) Patent No.: US 11,321,435 B2
(45) Date of Patent: May 3, 2022

(54) USER AUTHENTICATION SYSTEM AND METHOD FOR ENROLLING FINGERPRINT REFERENCE DATA

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 442 days.

(21) Appl. No.: 16/293,600

(22) Filed: Mar. 5, 2019

(65) Prior Publication Data

US 2019/0272363 A1 Sep. 5, 2019

(30) Foreign Application Priority Data

Mar. 5, 2018 (EP) .................................... 18160040
Mar. 20, 2018 (EP) .................................... 18162791

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/33* (2013.01); *G06V 40/1365* (2022.01)

(58) Field of Classification Search
None
See application file for complete search history.

(56) References Cited

U.S. PATENT DOCUMENTS 9,430,628 B2 8/2016 Kim et al.
9,665,785 B2 5/2017 Han et al.
(Continued)

FOREIGN PATENT DOCUMENTS

JP H08270281 A 10/1996

OTHER PUBLICATIONS

Ibrahim, Anas; Ouda, Abdelkader. Innovative Data Authentication Model. 2016 IEEE 7th Annual Information Technology, Electronics and Mobile Communication Conference (IEMCON). https://ieeexplore.ieee.org/stamp/stamp.jsp?tp=&arnumber=7746268 (Year: 2016).*

(Continued)

*Primary Examiner* — Jeremiah L Avery

(57) ABSTRACT

In accordance with a first aspect of the present disclosure, a user authentication system is provided, comprising: a user authentication token, said user authentication token comprising a fingerprint sensor and a secure element; an assistance device configured to be coupled to the user authentication token through an interface of said user authentication token; wherein the assistance device is configured to request the secure element to verify a personal unlock key to be captured by the secure element through the fingerprint sensor; wherein the secure element is configured to capture the personal unlock key through the fingerprint sensor, to verify the captured personal unlock key and to enroll, upon or after a positive verification of the personal unlock key, fingerprint reference data captured through the fingerprint sensor. In accordance with a second aspect of the present disclosure, a corresponding method for enrolling fingerprint reference data in a user authentication token is conceived. In accordance with a third aspect of the present disclosure, a corresponding computer program is provided.

15 Claims, 18 Drawing Sheets

(51) Int. Cl.
  *G06F 21/33* (2013.01)
  *G06V 40/12* (2022.01)

(56) References Cited

U.S. PATENT DOCUMENTS

| | | | | |
|---|---|---|---|---|
| 9,958,228 | B2* | 5/2018 | Stewart | F41A 19/01 |
| 10,147,076 | B2* | 12/2018 | Zhou | G06Q 20/3278 |
| 10,254,499 | B1* | 4/2019 | Cohen | H01R 4/024 |
| 2002/0095588 | A1* | 7/2002 | Shigematsu | G07C 9/257 |
| | | | | 705/65 |
| 2003/0014372 | A1* | 1/2003 | Wheeler | H04L 9/3231 |
| | | | | 705/71 |
| 2006/0198514 | A1* | 9/2006 | Lyseggen | H04L 9/3231 |
| | | | | 713/168 |
| 2008/0075330 | A1* | 3/2008 | Matsumura | G06V 40/1318 |
| | | | | 382/115 |
| 2013/0314208 | A1* | 11/2013 | Risheq | G06F 21/34 |
| | | | | 340/5.53 |
| 2014/0175179 | A1* | 6/2014 | Carter | G06Q 20/3224 |
| | | | | 235/494 |
| 2016/0140379 | A1* | 5/2016 | Pedersen | G06V 40/13 |
| | | | | 726/19 |
| 2017/0123487 | A1* | 5/2017 | Hazra | G06F 3/017 |
| 2017/0286789 | A1 | 10/2017 | Wintergerst Lavin et al. | |
| 2018/0173916 | A1* | 6/2018 | Endress | G06K 7/1417 |

OTHER PUBLICATIONS

Toh, Kar-Ann; Yau, Wei-Yun. Fingerprint and speaker verification decisions fusion using a functional link network. IEEE Transactions on Systems, Man, and Cybernetics, Part C (Applications and Reviews), vol. 35, Issue: 3. https://ieeexplore.ieee.org/stamp/stamp.jsp?tp=&arnumber=1487584 (Year: 2005).*
Extended European Search Report for Patent Appln. No. 18162791.0 (Dec. 13, 2018).
"Best Practices for Implementing Fingerprint Biometrics in Applications", DigitalPersona, Inc. 12 pgs., retrieved from the internet at: http://devportal.digitalpersona.com/docs/DP-wp-BestPracticesforImplementingBiometrics.pdf (Sep. 2012).
"Biometrics for Financial Institutions and the new Gemalto Biometric Sensor Payment card", gemalto, 11 pgs., retrieved from the internet at: https://www.gemalto.com/brochures-site/download-site/Documents/fs-wp-biometric-sensor-payment-card.pdf (Oct. 2017).

* cited by examiner

USER AUTHENTICATION SYSTEM AND METHOD FOR ENROLLING FINGERPRINT REFERENCE DATA

CROSS-REFERENCE TO RELATED APPLICATIONS

This application claims the priority under 35 U.S.C. § 119 of European patent application no. 18160040.4, filed on Mar. 5, 2018, and European patent application no. 18162791.0, filed on Mar. 20, 2018, the contents of which are incorporated by reference herein.

OVERVIEW

The present disclosure relates to a user authentication system. Furthermore, the present disclosure relates to a method for enrolling fingerprint reference data. Fingerprint sensing devices, such as capacitive fingerprint sensors, may be integrated into user authentication tokens, for example into smart cards. In order to personalize such a user authentication token, fingerprint reference data should be enrolled into the user authentication token. More specifically, a fingerprint template should be stored in a secure element of the token, so that—in operation—a captured fingerprint can be compared with said template in order to authenticate a user. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. The enrollment of fingerprint reference data is often performed under supervision in a secure environment, for example at the premises of a bank. This process is often not user-friendly and time-consuming. Thus, it is desirable to facilitate enrolling fingerprint reference data into user authentication tokens of the kind set forth.

SUMMARY

In accordance with a first aspect of the present disclosure, a user authentication system is provided, comprising: a user authentication token, said user authentication token comprising a fingerprint sensor and a secure element; an assistance device configured to be coupled to the user authentication token through an interface of said user authentication token; wherein the assistance device is configured to request the secure element to verify a personal unlock key to be captured by the secure element through the fingerprint sensor; wherein the secure element is configured to capture the personal unlock key through the fingerprint sensor, to verify the captured personal unlock key and to enroll, upon or after a positive verification of the personal unlock key, fingerprint reference data captured through the fingerprint sensor.

In an embodiment, the personal unlock key is a three-dimensional code pattern.

In an embodiment, the three-dimensional code pattern is a printable code pattern or a code pattern created by punching holes in a substrate.

In an embodiment, the three-dimensional code pattern is configured to be attached to or embedded in a document.

In an embodiment, at least a part of the personal unlock key comprises one or more gestures representing code elements of a known code alphabet.

In an embodiment, the interface is a contact-based interface according to the standard ISO/IEC 7816.

In an embodiment, the assistance device is further configured to provide power to the user authentication token.

In an embodiment, the assistance device is further configured to facilitate fixing a position of the user authentication token.

In an embodiment, the assistance device is included in a delivery package that comprises the user authentication token.

In an embodiment, the assistance device is at least partially made of the same material as the delivery package.

In an embodiment, the assistance device comprises an optical feedback unit configured to provide optical feedback to a user.

In an embodiment, the optical feedback unit comprises one or more light-emitting diodes.

In an embodiment, the user authentication token is a smart card.

In accordance with a second aspect of the present disclosure, a method for enrolling fingerprint reference data in a user authentication token is conceived, wherein said user authentication token comprises a fingerprint sensor and a secure element, the method comprising: coupling an assistance device to the user authentication token through an interface of said user authentication token; requesting, by the assistance device, the secure element to verify a personal unlock key to be captured by the secure element through the fingerprint sensor; capturing, by the secure element, the personal unlock key through the fingerprint sensor; verifying, by the secure element, the captured personal unlock key; enrolling, by the secure element, upon or after a positive verification of the personal unlock key, fingerprint reference data captured through the fingerprint sensor.

In accordance with a third aspect of the present disclosure, a computer program is provided, comprising executable instructions which, when executed by an assistance device or a secure element, cause said assistance device and secure element, respectively, to carry out steps of a method of the kind set forth.

DESCRIPTION OF DRAWINGS

Embodiments will be described in more detail with reference to the appended drawings, in which.

DESCRIPTION OF EMBODIMENTS

Figure 1:
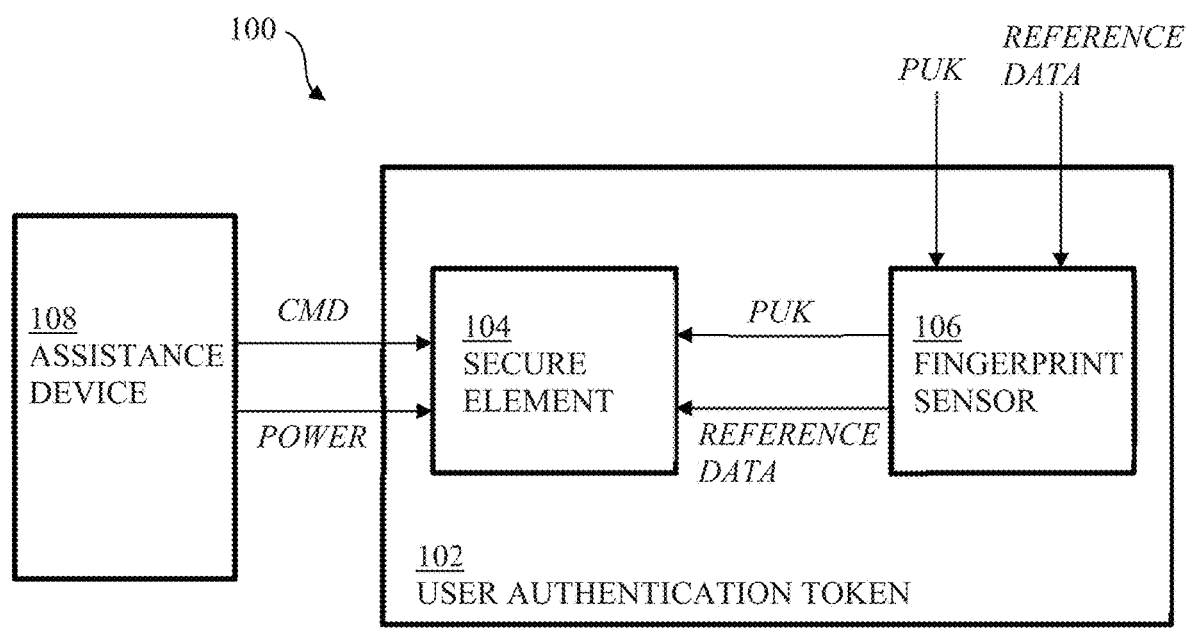
FIG. 1 shows an illustrative embodiment of a user authentication system.

Fingerprint sensing devices, such as capacitive fingerprint sensors, may be integrated into user authentication tokens, for example into smart cards. In order to personalize such a user authentication token, fingerprint reference data should be enrolled into the user authentication token. More specifically, a fingerprint template should be stored in a secure element of the token, so that—in operation—a captured fingerprint can be compared with said template in order to authenticate a user. The enrollment of fingerprint reference data is often performed under supervision in a secure environment, for example at the premises of a bank. This process is often not user-friendly and time-consuming. Thus, it is desirable to facilitate enrolling fingerprint reference data into user authentication tokens of the kind set forth.

More specifically, tokens such as smart wearables or smart cards equipped with a fingerprint-based user authentication function require the user to enroll his biometric credentials (i.e., fingerprint template) as reference data for later verification on the token. For adequate storage, the sensitive biometric credentials must be securely stored within such fingerprint-authenticated tokens. Currently, this enrollment process for payment tokens requires either an external computer, smartphone or internet connection or an enrollment at a bank branch. From a convenience perspective, it would be better to perform fingerprint enrollment on the token in a private environment, i.e. at the premises of the token holder, without compromising the security level of the token. For this purpose, a fingerprint template should be stored safely inside a secure element being embedded in such token. However, before enabling such an enrollment of a fingerprint template, the identity of the user should somehow be verified, so that the correct fingerprint template is enrolled—and not the template of a malicious person, for example when the token has been stolen. As mentioned, this identity verification is typically done at the premises of a token issuer (e.g., a bank), which is not user-friendly and time-consuming.

Therefore, in accordance with the present disclosure, a user authentication system is provided, comprising a user authentication token, wherein the user authentication token comprises a fingerprint sensor and a secure element. Furthermore, the system comprises an assistance device configured to be coupled to the user authentication token through an interface of said user authentication token. In addition, the assistance device is configured to request the secure element to verify a personal unlock key (PUK) to be captured by the secure element through the fingerprint sensor, and the secure element is configured to capture the personal unlock key through the fingerprint sensor, to verify the captured personal unlock key and to enroll, upon or after a positive verification of the personal unlock key, fingerprint reference data captured through the fingerprint sensor. In this way, by verifying a personal unlock key (PUK) before the fingerprint reference data are enrolled, the identity of the user can be verified securely in a private environment. Furthermore, since only a single sensor is used for capturing the PUK and the fingerprint reference data, the identity of the user can be verified in a resource-efficient way. It is noted that the assistance device is also referred to herein as an enrollment adapter, as a token interface or token interface adapter, or in short as an "adapter".

In an embodiment, the PUK is a three-dimensional code pattern. Such a pattern can easily be read by a fingerprint sensor. Thus, this embodiment facilitates using only a single sensor (i.e., the fingerprint sensor) for capturing the PUK and the fingerprint reference data. Furthermore, in an embodiment, the three-dimensional code pattern is a printable code pattern. In this way, the PUK can easily be delivered to a user, for example in shipping letter which is sent to a user separately from the user authentication token. Alternatively, the three-dimensional code pattern may be a code pattern created by punching holes in a substrate. Such a punching method or impacting method is a subtractive coding method, which has the advantage that the three-dimensional code pattern still exhibits a flat surface towards the surface of the fingerprint sensor. This, in turn, enables an adequate coupling to the fingerprint sensor.

Furthermore, in an embodiment, the three-dimensional code pattern is configured to be attached to or embedded in a document. For example, the code pattern may be printed and attached to the above-mentioned shipping letter. In that case, the user may simply detach the code pattern from the letter, and place the code pattern on the fingerprint sensor when prompted to do so. Thus, this embodiment increases the user convenience. Alternatively, or in addition, at least a part of the PUK may comprise one or more gestures representing code elements of a known code alphabet. Gesture-based code entry has been described in, inter alia, EP 2 575 084 A1. This embodiment may further increase the level of security as well as the user convenience.

In a practical and effective implementation, the interface is a contact-based interface according to the standard ISO/IEC 7816. In this way, since a standardized and commonly available interface is used, no additional interface needs to be provided for connecting the assistance device to the secure element. Alternatively, the interface may be a contactless interface according to the standard ISO/IEC 14443. Furthermore, in an embodiment, the assistance device is further configured to provide power to the user authentication token. A user authentication token of the kind set forth often does not contain a power source. For example, a smart card does often not have a battery, but it is powered by an external device—e.g. a reader embedded in a payment terminal—either through a contact-based interface (ISO/IEC 7816) or a contactless interface (ISO/IEC 14443). Such an external device is often not available when the user receives the smart card and wishes to commence the enrollment process. Therefore, the assistance device may be configured to provide power to the user authentication, in a comparable way as said external device, for example through the contact-based interface (ISO/IEC 7816). For this purpose, the assistance device may contain its own power source (e.g., a battery) or be connected to an external power source.

In an embodiment, the assistance device is further configured to facilitate fixing a position of the user authentication token. In this way, in case the PUK is a three-dimensional code pattern, for example, the user may easily place the PUK on the fingerprint sensor. It can be envisaged, for example, that a smart card is delivered in a package made of cardboard, and that the assistance device is integrally formed with said cardboard package. In that case, the cardboard package may fix the position of the smart card, and a removable part of the package—having a cut-out, for instance—is placed above the smart card so that the cut-out indicates to the user where the three-dimensional code pattern should be placed. Thus, this embodiment increases the user convenience. Furthermore, in an embodiment, the assistance device is included in a delivery package that comprises the user authentication token. In this way, the assistance device can easily be delivered to the user. For instance, in the above-described example, the assistance device can be integrally formed with a cardboard package in which a smart card is shipped to a user. The PUK can then be sent in a separate shipping letter to the user. This is a cheap and convenient, yet secure, way to deliver the user authentication token, the assistance device and the PUK to the user. Furthermore, in a practical and effective implementation, the assistance device is at least partially made of the same material—e.g. cardboard—as the delivery package. In addition, the assistance device contains electronic components for performing its function or functions. Finally, in an embodiment, the assistance device comprises an optical feedback unit configured to provide optical feedback to a user. Such an optical feedback unit may guide the user through the PUK entry and fingerprint reference data enrollment process, as will be explained in more detail below. In a practical and effective implementation, the optical feedback unit comprises one or more light-emitting diodes (LEDs). LEDs do not consume much power and can easily be controlled.

FIG. 1 shows an illustrative embodiment of a user authentication system 100. The system 100 comprises a user authentication token 102 and an assistance device 108 of the kind set forth. The user authentication token 102 comprises a secure element 104 and a fingerprint sensor 106. The assistance device 108 is configured to request the secure element 104, e.g. by means of a command (CMD), to verify a personal unlock key (PUK) to be captured by the secure element 104 through the fingerprint sensor 106. The secure element 104 may be configured to initiate—optionally via a processing unit or microcontroller (not shown)—a measurement process of the fingerprint sensor 106. The user may then be prompted to place the PUK on the sensor 106, for example, and the fingerprint sensor 106 reads out the PUK. Thus, the secure element 104 effectively captures the PUK through the fingerprint sensor 106. Furthermore, the secure element 104 is configured to verify the captured PUK and to enroll, upon or after a positive verification PUK, fingerprint reference data captured through the fingerprint sensor 106. For this purpose, the secure element 104 may again be configured to initiate—optionally via said processing unit or microcontroller—a measurement process of the fingerprint sensor 106. The user may then be prompted to place his finger on the sensor 106, for example, and the fingerprint sensor 106 reads out the fingerprint reference data. The secure element 104 may enroll the fingerprint reference data by storing said data securely in a memory unit (not shown) of the secure element 104.

Figure 2:
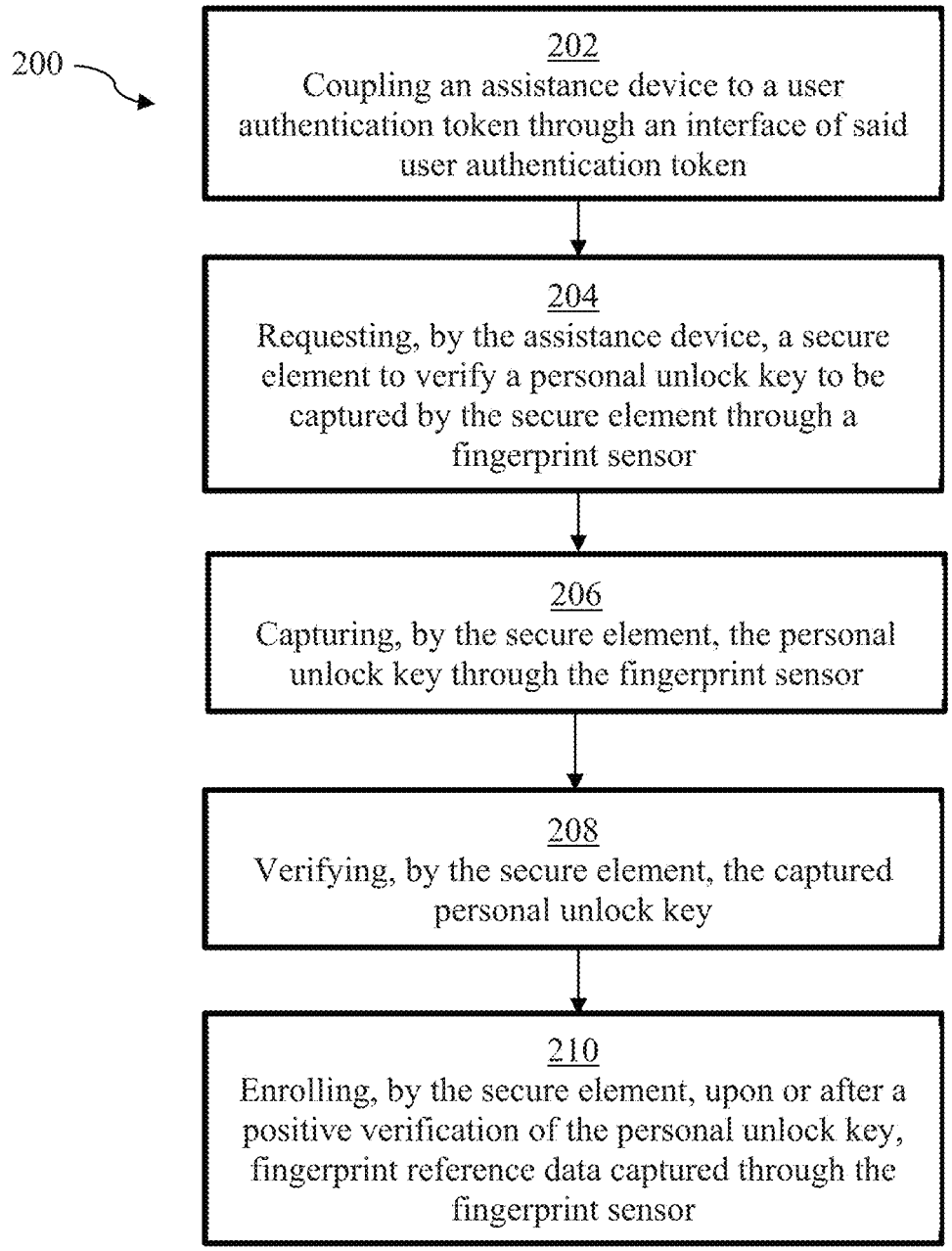
FIG. 2 shows an illustrative embodiment of a method for enrolling fingerprint reference data in a user authentication token.

FIG. 2 shows an illustrative embodiment of a method 200 for enrolling fingerprint reference data in a user authentication token. The method 200 comprises, at 202, coupling an assistance device to a user authentication token through an interface of said user authentication token. Furthermore, the method 200 comprises, at 204, requesting, by the assistance device, a secure element to verify a personal unlock key to be captured by the secure element through a fingerprint sensor. Furthermore, the method 200 comprises, at 206, capturing, by the secure element, the personal unlock key through the fingerprint sensor. Furthermore, the method 200 comprises, at 208, verifying, by the secure element, the captured personal unlock key. Finally, the method 200 comprises, at 210, enrolling, by the secure element, upon or after a positive verification of the personal unlock key, fingerprint reference data captured through the fingerprint sensor.

Figure 3A:
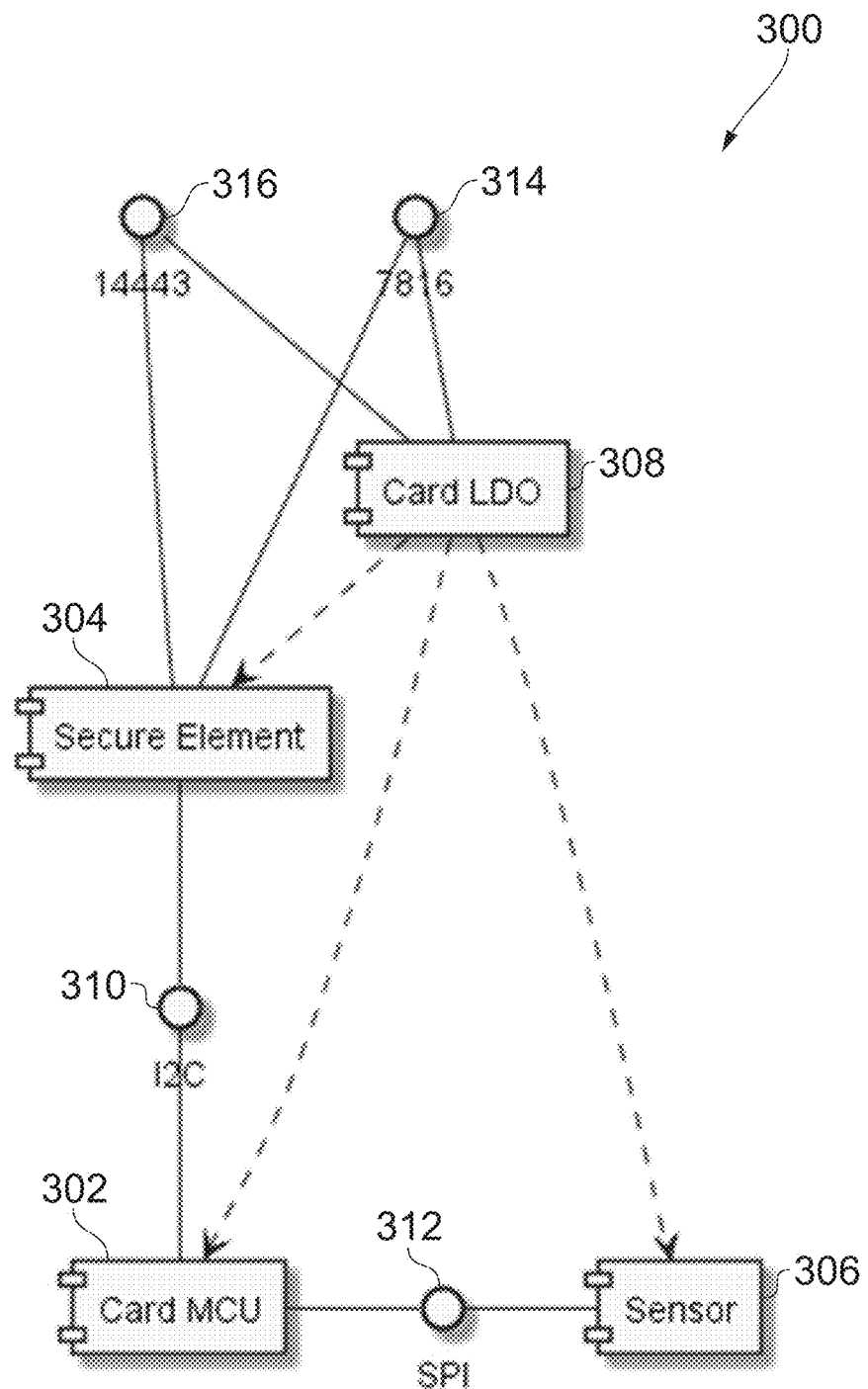
FIG. 3A shows an example of a token architecture.

FIG. 3A shows an example of a token architecture 300. In particular, FIG. 3A shows components of a typical fingerprint-enabled user authentication token, such as a smart card. The token comprises a secure element 304, a card microcontroller (MCU) 302 and a fingerprint sensor 306. For power conditioning, a card low dropout regulators (LDO) 308 is provided. The secure element 304 handles secure communication with a security network, which may be a payment network. The sensor 306 converts biometric features by means of the card MCU 302 into a feature set that is machine readable, more specifically readable by the secure element 304. In case of a smart card, the secure element 304 may e.g. communicate through standardized interfaces, such as a contact-based interface (ISO 7816) 314 or a contactless interface (ISO 14443) 316. In case of a smart wearable device, the communication may be established e.g. through a Bluetooth or Wi-Fi channel. In case of a smart card, power may be derived through said communication interfaces. It is noted that, in this description, the terms "token MCU" and "card MCU" are used interchangeably, as well as the terms "token interface adapter" and "card adapter", and "card LDO" and "token LDO", if not otherwise specified.

Figure 3B:
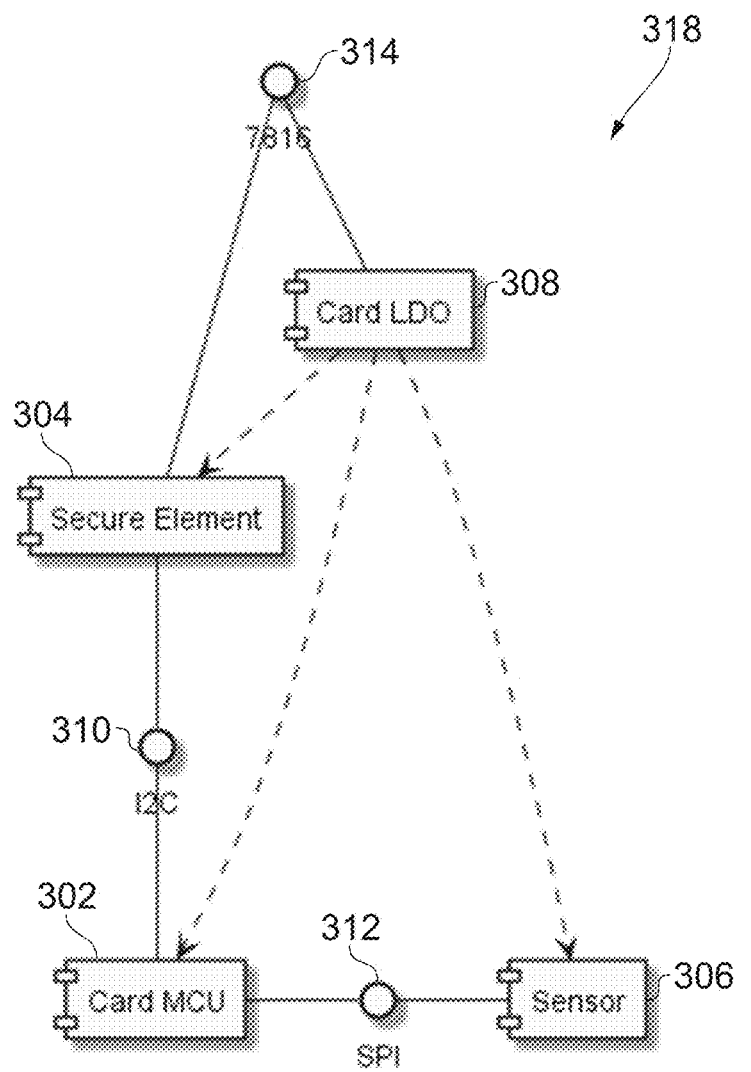
FIG. 3B shows another example of a token architecture.

FIG. 3B shows another example of a token architecture 318. In particular, FIG. 3B shows an example of a typical token that does not have a contactless interface. In other words, a simplified token architecture is shown, which only has a contact-based interface 314. It is noted that the presently disclosed system and method are not limited to tokens that only have a such a contact-based interface 314; they may equally be applied in tokens having a contactless interface or another interface.

Figure 3C:
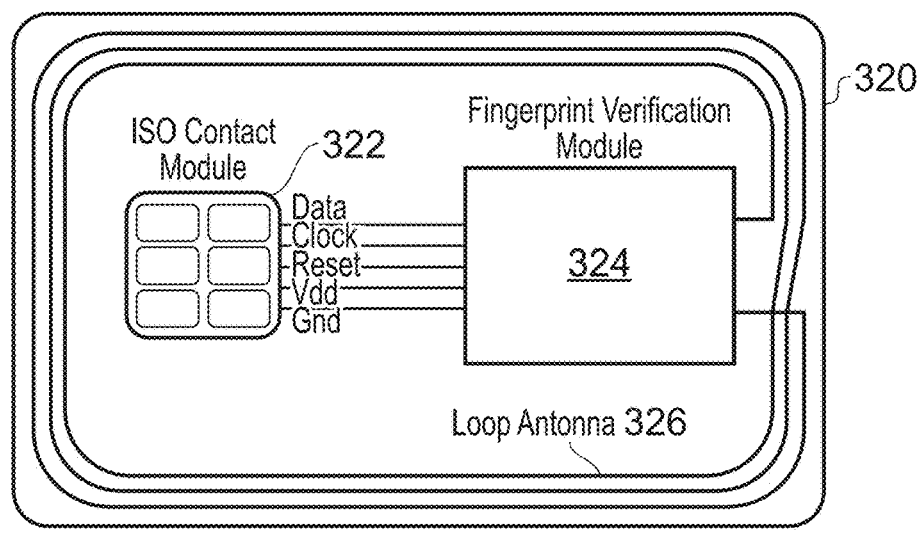
FIG. 3C shows an example of a smart card.

FIG. 3C shows an example of a smart card 320. In particular, FIG. 3C shows a typical fingerprint-enabled smart card 320, having an ISO contact module 322 that effectively implements the contact-based interface (ISO 7816). Furthermore, the smart card contains a fingerprint verification module 324 operatively coupled to the ISO contact module 322. The fingerprint verification module 324 typically contains a secure element, an application processor, and a fingerprint sensor: the fingerprint sensor may provide captured fingerprint data to the application processor, which may forward said fingerprint data the secure element. The secure element may then verify said fingerprint data, for example by comparing them with stored fingerprint reference data of the kind set forth above. Furthermore, a loop antenna 326 may be provided for establishing contactless communication.

Figure 4:
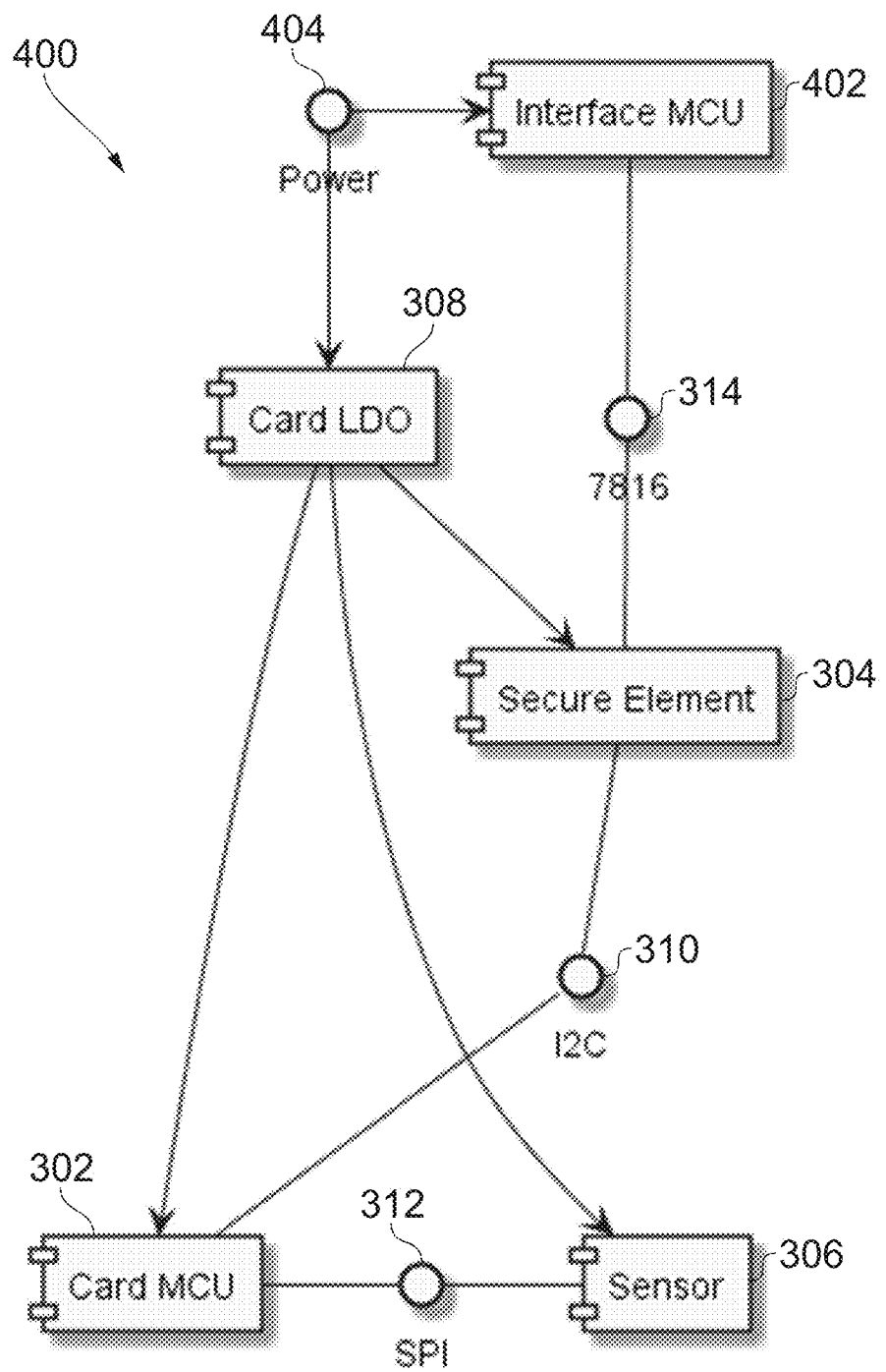
FIG. 4 shows an illustrative embodiment of a token architecture.

FIG. 4 shows an illustrative embodiment of a token architecture 400. The token comprises components as shown in FIGS. 3A and 3B. An interface MCU 402, i.e. a microcontroller comprised in an assistance device of the kind set forth, is connected to the contact-based interface 314 of the token. A power source 404 may be connected to both the interface MCU 308 and the card LDO 308, in order to provide operating power to said interface MCU 308 and the various components of the token (secure element 304, card MCU 302, and sensor 306). It is noted that both the power source 404 and the interface MCU 402 are external to the token.

To stimulate enrollment under involvement of the secure element 304, the secure element 304 should receive a corresponding command, for example formatted as an application protocol data unit (APDU). For security reasons, the secure element 304 should behave as a slave towards an external security network. For providing such a stimulating command APDU, a programmable interface MCU 402 may be executing code that sends the required command APDU through the ISO 7816 interface 314 to the token's secure element 304. Since enrollment requires user entry and user feedback, the interface MCU 402 may also control a simple user interface.

Figure 5:
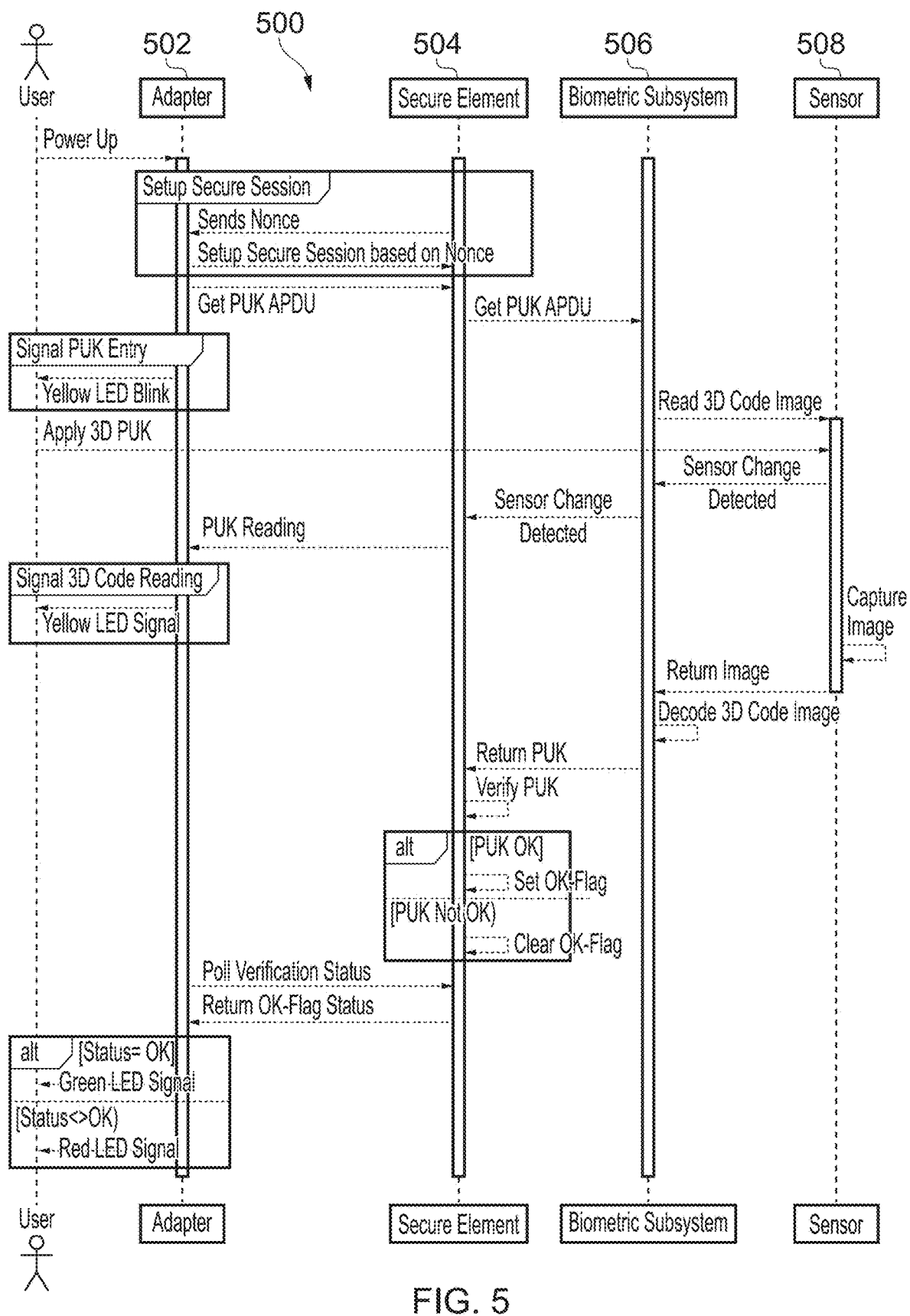
FIG. 5 shows an illustrative embodiment of a PUK entry and verification flow.

FIG. 5 shows an illustrative embodiment of a PUK entry and verification flow 500. More specifically, interactions between the assistance device 502 (i.e., adapter), secure element 504, biometric subsystem 506 (e.g., processing unit), and fingerprint sensor 508 are shown. These interactions may implement the PUK entry and verification flow. In short, the PUK entry and verification flow may contain the following elements:

- a user connects a token to the enrollment adapter 502;
- the enrollment adapter 502 establishes a secure communication session with the secure element 504;
- the enrollment adapter 502 requests the user, e.g. using an optical feedback indicator or other user interface, to authenticate towards the token by providing a PUK;
- the enrollment adapter 502 sends a request to the token, in particular to the secure element 504, to capture and verify the token holder's PUK;
- the token holder enters his PUK through the fingerprint sensor's surface;
- the PUK is compared by the secure element 504 against a secret stored within the secure element 504 with the purpose to verify the token holder's identity;
- upon a negative verification the user may be informed that the PUK-based authentication failed, and the token may be set into an idle mode;
- upon a positive verification the token is enabled for a fingerprint template enrollment process during the established communication session.

Figure 6:
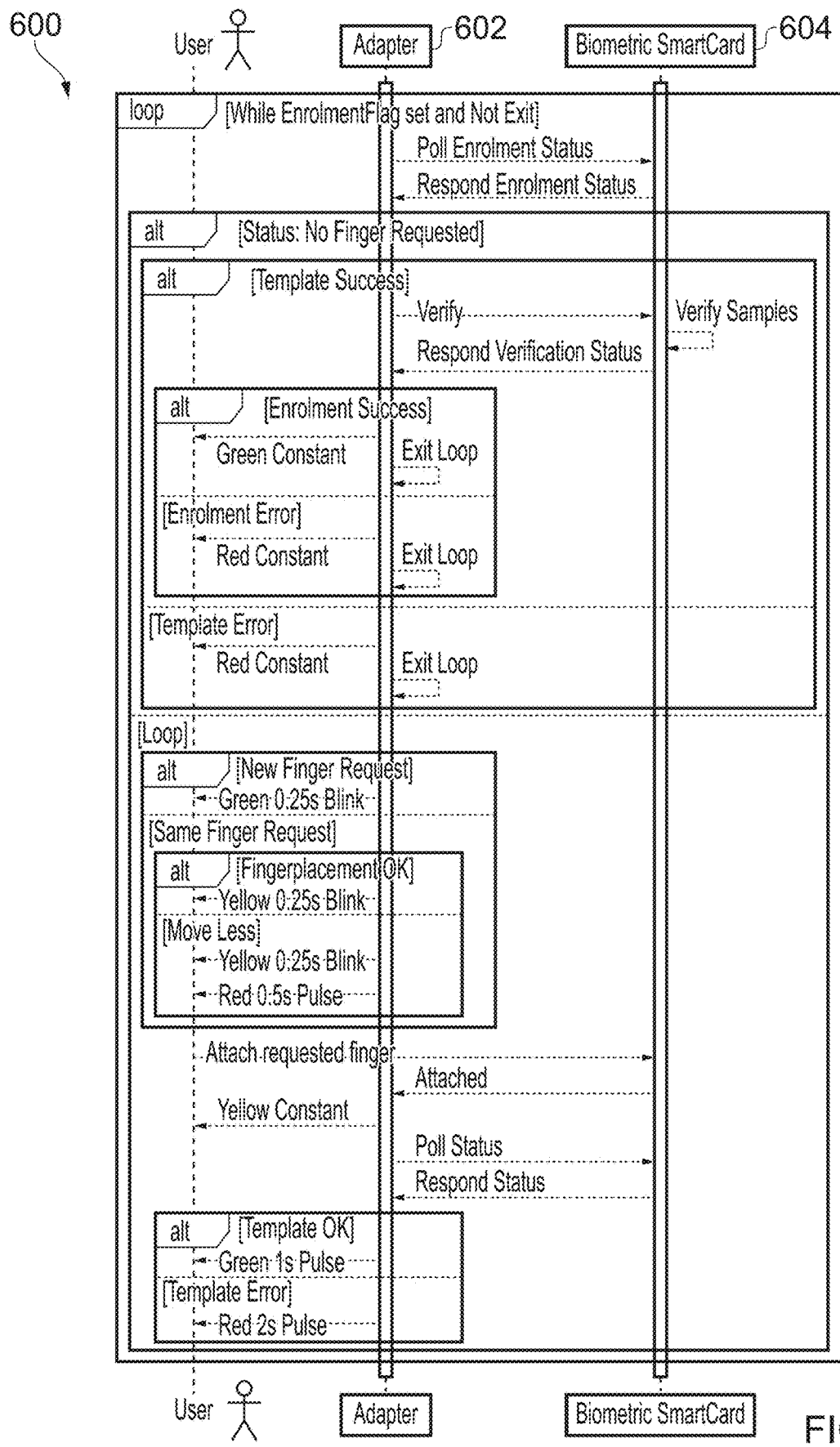
FIG. 6 shows an illustrative embodiment of a fingerprint reference data enrollment flow.

FIG. 6 shows an illustrative embodiment of a fingerprint reference data enrollment flow 600. More specifically, interactions between the assistance device 602 (i.e., adapter) and the token 604 (i.e., biometric smart card) are shown. The smart card comprises the secure element, biometric subsystem and fingerprint sensor, which are not shown separately in this figure. These interactions may implement the fingerprint reference data enrollment flow.

If the PUK authentication was successful, the token 604 may be activated for enrollment. The activation status may be implemented by setting/resetting an activation flag. If the PUK is provided as a 3-dimensional key, removal of the key from the sensor may be indicative for configuring the token 604 for enrollment. In case of alternative ways to provide the PUK, a signal provided by the cardholder, that may e.g. be a long press by finger on the sensor, may configure the token 604 for enrollment. When configured for enrollment, optical feedback indicators (e.g. LEDs) may indicate task requests and may also provide feedback on task execution. The core of the enrollment functionality may be implemented as an enrollment application being securely executed by the secure element. Next to starting the enrollment application, the token interface may only poll the status of the enrollment application and stimulate user actions or provide status feedback to the user. This approach maintains security integrity and leaves full control of enrollment to the secure element. Whatever is executed in terms of enrollment may only run under control of the secure element. The user interface shown by way of example in the sequence diagram may only synchronize with the enrollment process executed by the secure element by exchange of status information. The token interface may translate the status information into feedback representing user task requests or user feedback. Such status information may comprise:

TABLE 1

| Task Request | Feedback |
| --- | --- |
| Request sample of new finger | Finger attached |
|  | Captured successfully |
|  | Move less |
|  | Capture Error |
| Request Sample of current finger | Finger attached |
|  | Captured successfully |
|  | Move less |
|  | Capture Error |
|  | PUK Verified |
|  | PUK Error |
|  | Enrolment Successful |
|  | Enrolment Error |

To reduce the time required to enroll a biometric token, the generation of the reference data set may be spread over an initial generation of a subset of the reference dataset and a succeeding period collecting and adding additional reference template members at successful authentications as an extension of the reference dataset until a number of templates has been collected that satisfies the False Acceptance Rate (FAR) and False Reject Rate (FRR) requirements of the biometric system. Starting with a lower number of reference samples may either result in an increased FRR or an increased FAR, depending of the setting of the biometric system. If not all required reference template members have been captured, a potential decrease of the FAR may be offset by invoking PIN-entry as secondary cardholder verification method in case of transaction values exceeding a pre-defined level. For normal users, majority of transactions may be below such critical transaction value so that secondary cardholder verification method needs to be applied and the template extension period may not be visible to the end user. Finally, it may be the responsibility of the issuing bank to find a good compromise between enrollment convenience and authentication security.

This approach not only enhances the convenience for the token holder significantly as only a limited number of reference template members need to be captured and added to the reference template data set during an initial enrollment process, but it also improves the quality of the reference template data set. The time elapsed between successive template member acquisitions enhances the reliability of the reference template data set especially in terms of FRR as this method may also cover natural and random spreads caused by time-based variation of fingerprints.

In some embodiments, dynamic template renewal may be randomly executed when a randomly defined life-time interval associated to a member of a template data set has elapsed with the purpose to consider long-time variations of fingerprints. To avoid security risks, a member of a reference template data set being associated to the finger being applied for an actual authentication may, in case of a successful authentication, be replaced by a new reference template member created from the captured fingerprint. The reference template member to be replaced may be chosen randomly. The procedure and the parameters controlling the dynamic template renewal must reside within the secure element.

Figure 7:
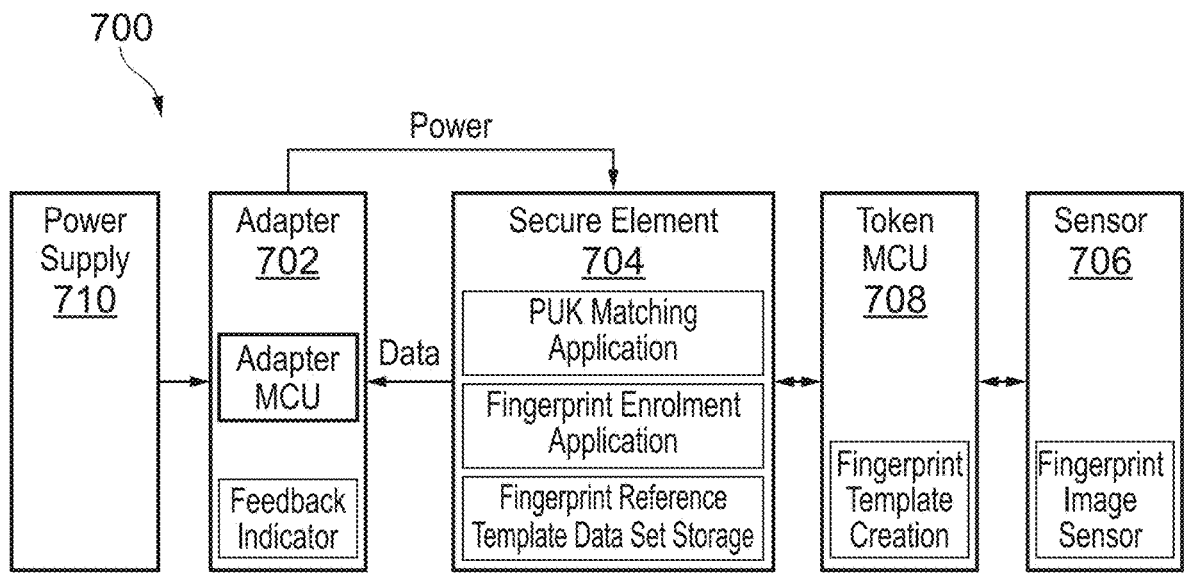
FIG. 7 shows an illustrative embodiment of a user authentication system.

FIG. 7 shows an illustrative embodiment of a user authentication system 700. The system comprises an adapter 702 (i.e., an assistance device), a secure element 704, a fingerprint sensor 706, a token MCU 708, and a power supply 710. To enable reference template storage within the secure element 704, the adapter MCU may send APDU commands to the token's secure element 704 that may stimulate the token to facilitate a token owner authentication, and in another processing step, to capture multiple token holder's fingerprint samples, process them into templates and add such templates as members to a reference template data set being securely stored within the secure element 704. For communication, the adapter 702 may contain an ISO 7816 interface that enables the adapter MCU to communicate command instructions to the secure element 704 embedded in the token, specifically to a computer program that is stored in, and can be executed by, the secure element 704. Said instructions may be decoded and executed by said computer program. The ISO 7816 interface of the adapter 702 may be implemented by a hardcoded functional block or by a soft-coded functional block.

Figure 8:
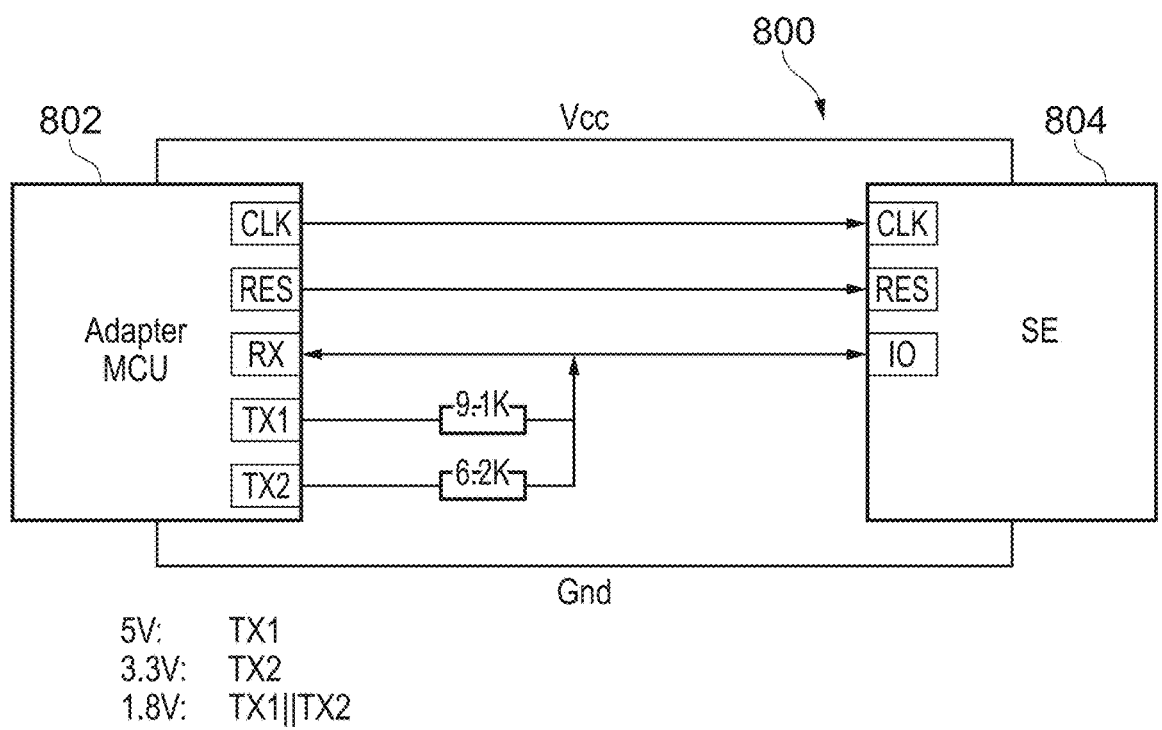
FIG. 8 shows an illustrative embodiment of an ISO/IEC 7816 interface implementation.

FIG. 8 shows an illustrative embodiment of an ISO/IEC 7816 interface implementation 800. It is noted that ISO/IEC 7816 is referred to as "ISO 7816" in short. In this example, the adapter MCU 802 and the secure element 804 communicate with each other through an ISO 7816 interface. The interface may be configured to comply with various supply voltages, as shown. For instance, by activating either TX1 or TX2 or activating TX1 and TX2 concurrently, appropriate pullup resistors become effective for specific supply voltages.

Figure 9:
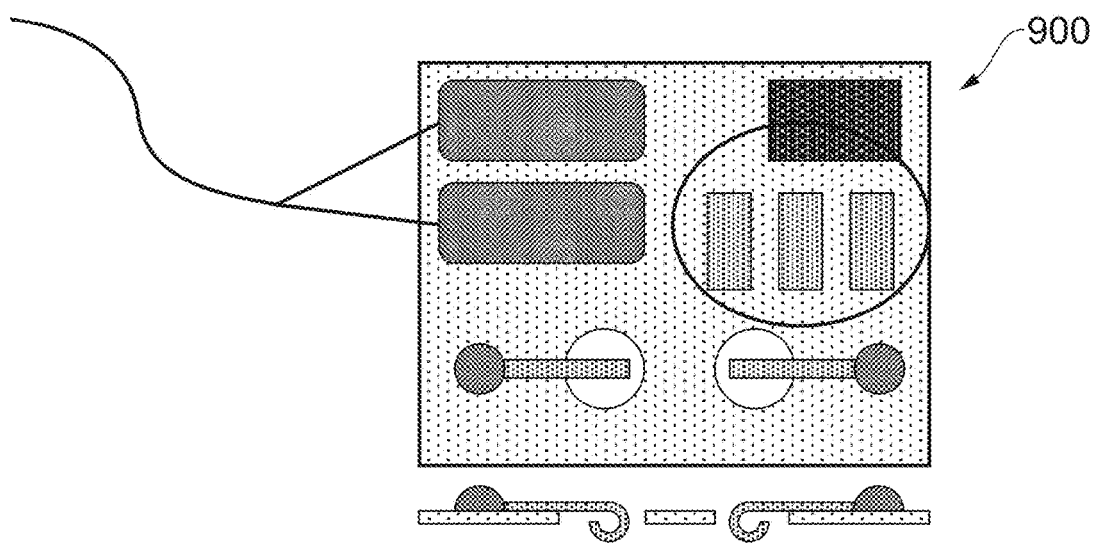
FIG. 9 shows an illustrative embodiment of an interface adapter PCB assembly.

FIG. 9 shows an illustrative embodiment of an interface adapter PCB assembly 900. The components forming the adapter interface may be implemented as a PCB assembly, as shown. Spring contacts may be configured to establish contact with the required token interface pads VCC, VSS, CLK, RESET and IO. Furthermore, the feedback element or elements (which may be optical indicators), the adapter MCU and passive components that may be required, may be mounted on a printed circuit board (PCB), which may also provide contact pads for attaching a wire connection to a power source or power supply. The power source or power supply may for example be a supply voltage provided by a universal serial bus (USB) port of an external device. The external device may for example be a USB charger, a laptop, a car, a plane, a power bank.

Figure 10:
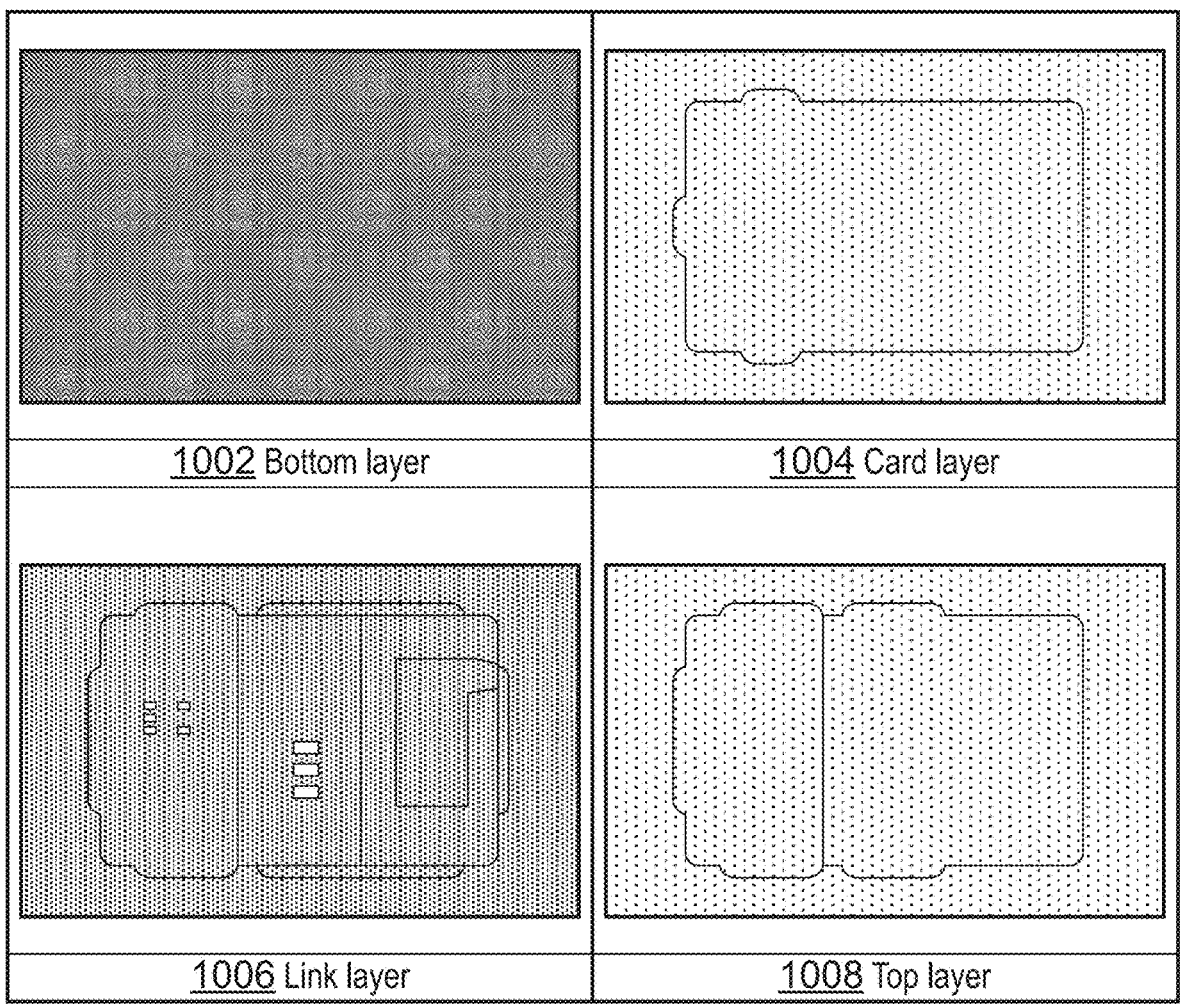
FIG. 10 shows an illustrative embodiment of card packaging sheets.

FIG. 10 shows an illustrative embodiment of card packaging sheets 1000. For weight, dimension and cost reasons, the housing for the token interface adapter may be made from packaging material that is normally used to ship the token safely to the token holder. For that reason, a part of the packaging material is configured to form pre-punched components, that after breakout may be assembled quickly to form the token interface adapter. FIG. 10 shows the assembly of the token interface adapter. In this example, the token is a smart card.

Figure 11:
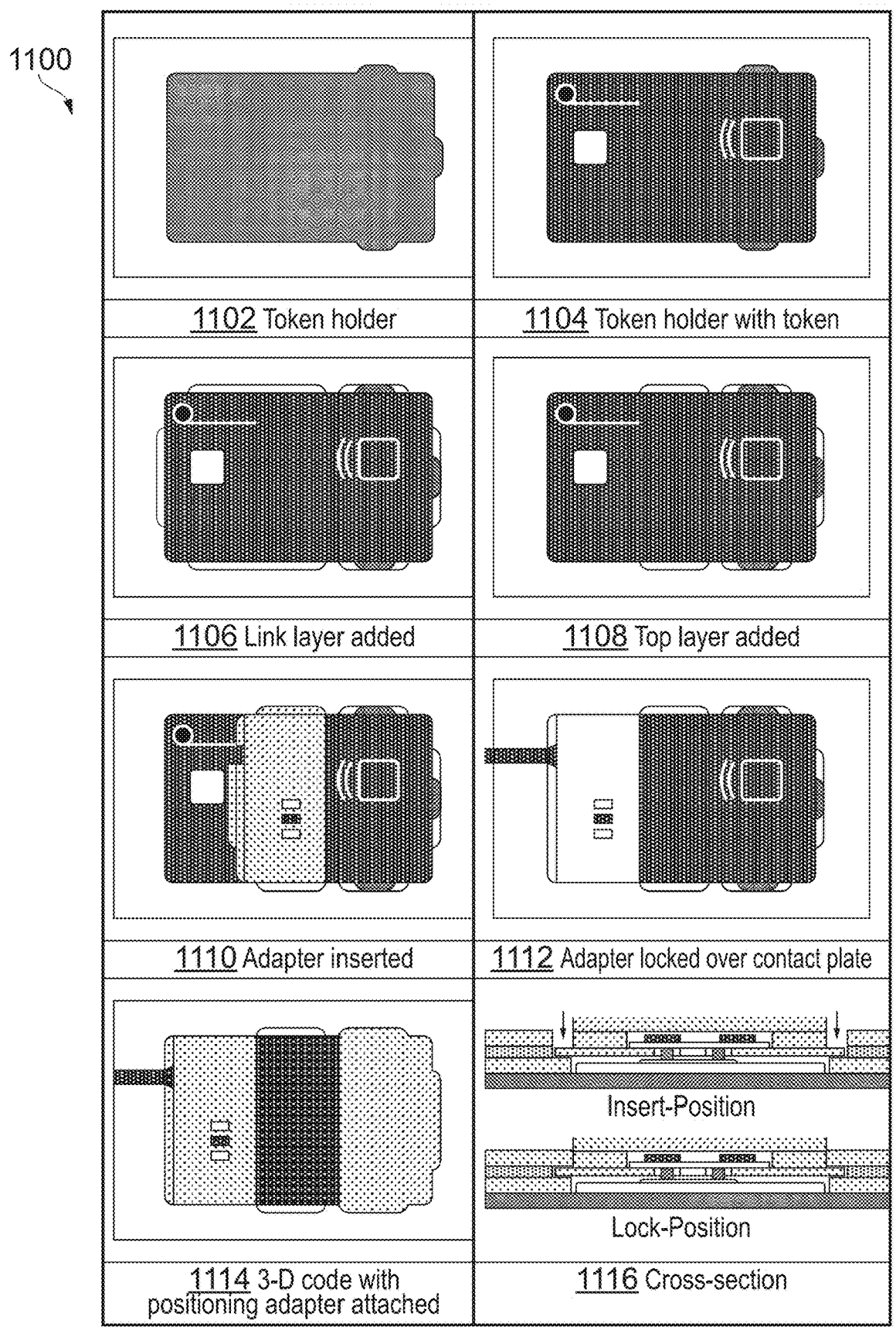
FIG. 11 shows an illustrative embodiment of assembly steps.

FIG. 11 shows an illustrative embodiment of assembly steps 1100. A token fixture that may be assembled from breakout parts may be designed such that it takes up the token exactly. Such a fixture may enable a precise positioning of a finger on the fingerprint sensing area. Bottom and card layer may be preassembled and serve as packaging for the card (i.e., the token) when sent to the token holder. The link layer may have bulges for facilitating the fixing of the token interface adapter. To fix the token interface adapter, it is inserted into the fixture and then slid over the card's contact area. The top layer may cover the bulges of the link layer, thus providing support for fixing the interface adapter.

Figure 12:
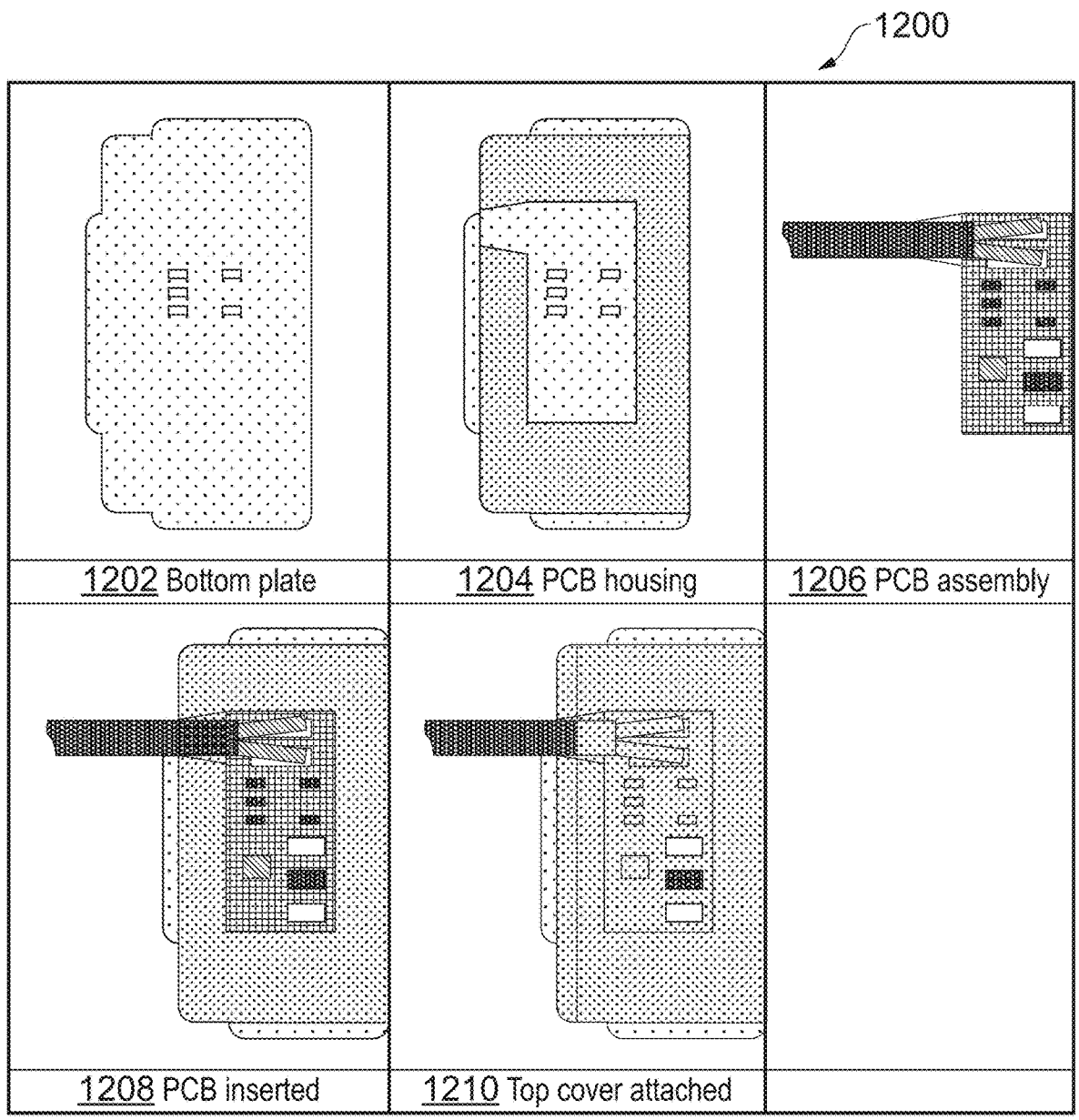
FIG. 12 shows another illustrative embodiment of assembly steps.

FIG. 12 shows another illustrative embodiment of assembly steps 1200. As shown, the token interface adapter is assembled from breakout parts of the link layer sheet and a pre-assembled PCB with an attached power connection cable. The first two parts are joined by suitable means, the PCB assembly is inserted such that the contact springs reach though the bottom part and the feedback indicators face the top side. The top plate is joined by suitable means as well, which completes the assembly of the interface adapter. The token interface adapter assembly has bulges that fix the token interface adapter to the token fixture and that make sure that the token interface adapter is positioned exactly above the card to gain correct access to the card's contact interface. The optical feedback indicator faces the cardholder.

Figure 13:
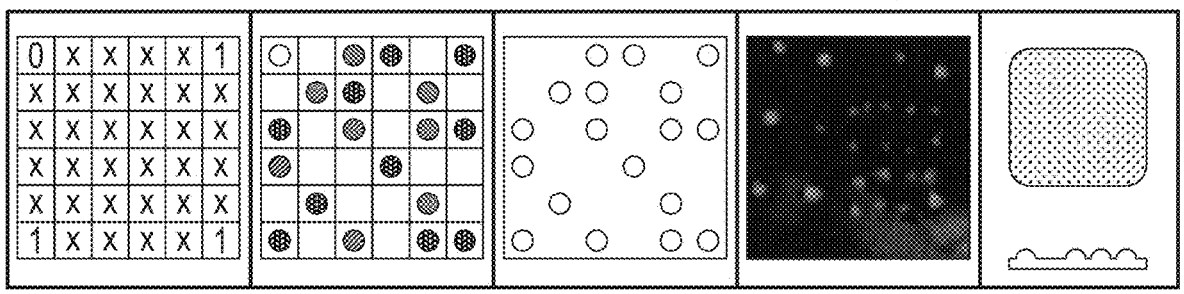
FIG. 13 shows an illustrative embodiment of a three-dimensional code pattern.

The following options can be envisaged for implementing a user interface in case of offline enrollment:
  The fingerprint sensor may be utilized for data entry
  LEDs may be utilized to provide optical feedback
  In case of three LEDs the signals provided to the user may be:
    Yellow+blink: user requested to attach same finger
    Yellow constant: template member generation in progress
    Green+blink: user requested to attach new finger
    Green Pulse: PUK read successfully, template member creation successful
    Red Pulse: Error in PUK reading, Error in template member creation
    Green Short Pulse and Yellow Short Pulse: Move finger less
    Green constant: Enrollment successful
    Red constant: Error in enrollment
  In case of two LEDs the signals provided to the user may be:
    Green+blink: user requested to attach same finger
    Green+blink AND Red+blink: user requested to attach new finger
    Green Pulse: PUK read successfully, template member creation successful
    Red Pulse: Error in PUK reading, Error in template member creation
    Green Short Pulse and Red Short Pulse alternating: Move finger less
    Green constant: Enrollment successful
    Red constant: Error in enrollment FIG. 13 shows an illustrative embodiment of a three-dimensional code pattern 1300. In accordance with the present disclosure, the fingerprint sensor itself may be utilized for entering a PUK. The fingerprint sensor may provide a direct option for entering data into the token. A fingerprint sensor is designed to capture 3-dimensional patterns; for this reason, such a sensor may also be utilized to capture 3-dimensional code patterns that are not fingerprints. Therefore, the PUK may be read by the fingerprint sensor if the PUK takes the form of a sensor-readable 3-dimensional structure, which will significantly increase the cardholder's convenience level. To comply with the sensor, data may be encoded by modulating at predefined data positions the z-axis. Such data positions may be arranged in a matrix type structure as shown in FIG. 13. In the example shown, a 6×6 dot code matrix represents a 32-bit code including a rotation indicator. Corner positions may be pre-coded by a pattern that enables rotation identification. Such a code may be structured on a conductive substrate by printing with conductive ink. The height of printed dots may match the height of average fingerprint ridges, which is about 25 µm. The diameter of the dots may e.g. be between 100 µm and 300 µm, the dot pitch e.g. between 600 µm and 1000 µm. The resulting 3-dimensional code may be covered by a protection layer such that the total height of dots and protection layer (above the carrier substrate) may not exceed the normal ridge height of about 25 µm.

In other embodiments, the 3-dimensional code may be formed by creating holes, e.g. by laser-drilling or by mechanical drilling in a conductive substrate made of e.g. aluminum or copper. Such a 3-dimensional code may be attached by suitable means to a positioning plate at the time of enrollment, as shown in the rightmost column of FIG. 13. Such a positioning plate, which may be configured from breakout material as described above, may facilitate a precise positioning of the 3-dimensional code pattern over the token's fingerprint sensor. In other embodiments, a printer having a punching effect (e.g. matrix printer) may be applied to a conductive material that may e.g. be aluminum or copper or a carbonized substrate. By punching, the PUK information may be programmed into the substrate material, resulting in a 3-dimensional code pattern. An example for an image collected from a punched aluminum foil with a standard capacitive fingerprint sensor at a resolution of 254 dpi is indicated above ($2^{nd}$ column from the right). This example may prove, that even code pixel array sizes of 8×8 pixels up to 10×10 pixels may be read by 254 dpi sensors. Sensors with higher resolution may enable even larger code matrix dimensions. In some embodiments, error correction information may be combined into the code pattern to enable correction of errors that may occur between code generation and code reading. Furthermore, in some embodiments, in case a code is implemented by creating holes in a carrier substrate, the thickness of the carrier substrate may be configured such that it prevents damage of the 3-dimensional code during shipment and as such may avoid the application of a code protecting layer.

Figure 14:
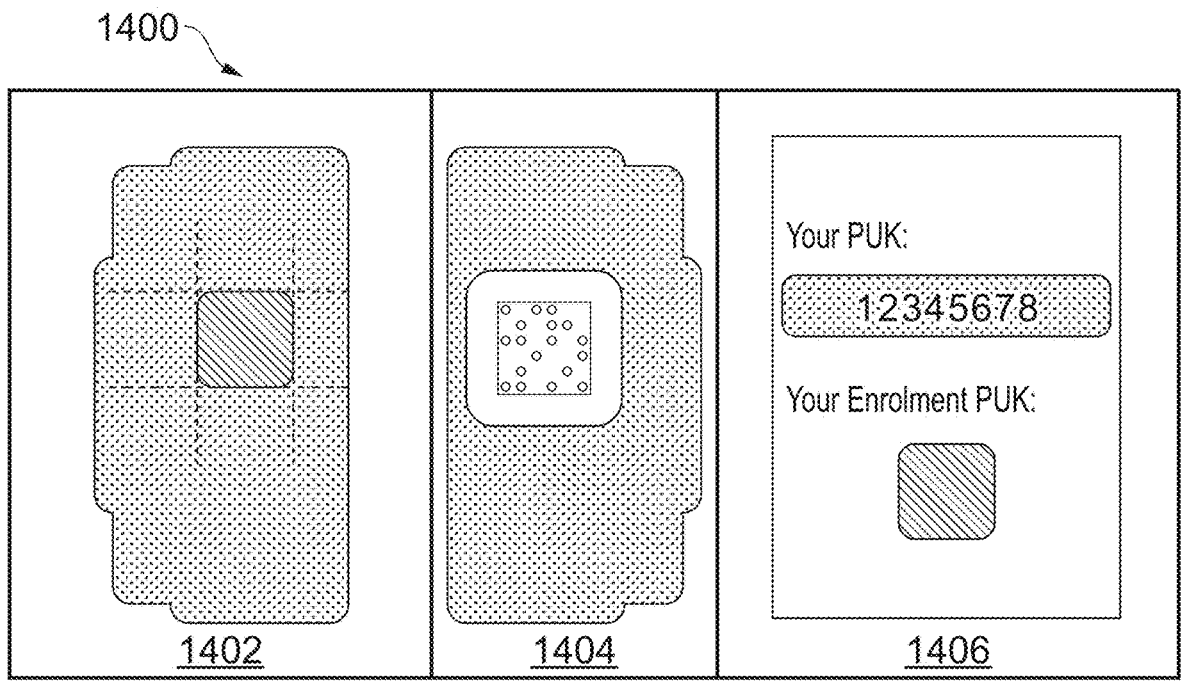
FIG. 14 shows another illustrative embodiment of a three-dimensional code pattern.

FIG. 14 shows another illustrative embodiment of a three-dimensional code pattern 1400. The 3-dimensional code may be delivered to the cardholder by post mail as a sticker, that may be peeled off the PUK-letter 1406 and subsequently be attached to the positioning plate. The positioning plate may provide an option to apply the 3-dimensional code to the sensor with exact placement directly over the fingerprint sensor. For achieving that, the positioning plate may be configured to fit only in one orientation into the token fixture as described above. In a successive processing step, the 3-dimensional code may be processed into a grayscale image, that may be further processed into a PUK. In one embodiment, shown in the middle column of FIG. 14, the 3-dimensional key may be attached to a film carrier, that may be fixed to the positioning plate. The token holder may press the key with his finger against the sensor to achieve the best possible reading performance. This embodiment may be well suited for capacitive fingerprint sensors having a drive electrode (bezel) that normally establishes galvanic contact to the finger. Furthermore, the film may exhibit a slight spring effect, that removes the 3-dimensional PUK from the sensor when the finger is released. Said effect may emulate the function of an encoded switch.

In some embodiments, the token adapter may indicate to the secure element that a finger may be attached to the fingerprint sensor. In other embodiments, a resistor being inserted in either the power line or the ground line may be configured to act as a short circuit protection to avoid a short circuit caused by not placing the token interface adapter correctly over the token. In some embodiments, the token interface adapter may indicate to the secure element that a finger with ordinal number n may be attached to the fingerprint sensor. In some embodiments, the token interface adapter may indicate to the secure element that a finger with ordinal number n may be attached to the fingerprint sensor to capture a template having ordinal number m. In some embodiments, the number of fingers used for capturing reference template data sets may be larger than 2. In some embodiments, the number of feedback indicators may differ from the number of 2 or the number of 3. In some embodiments, the token interface adapter may be pre-assembled from components made e.g. of thermoplastic material and from a PCB pre-assembly. This embodiment may minimize the effort for setting up the token interface.

Figure 15:
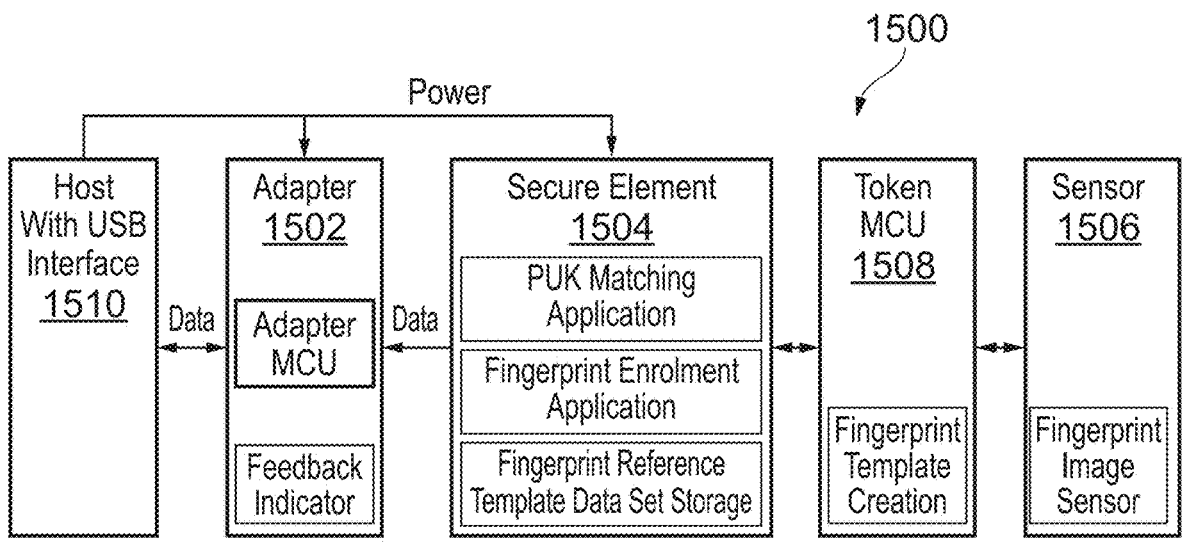
FIG. 15 shows another illustrative embodiment of a user authentication system.

FIG. 15 shows another illustrative embodiment of a user authentication system 1500. In some embodiments, the adapter's interface may be configured as a USB to ISO7816 interface, so that the secure element of the smart card may communicate through said interface with a host device executing an enrollment application, wherein said enrollment application may also provide a user interface. Thus, the adapter 1502 may form in conjunction with the host device a standard card reader that may be utilized for card access beyond enrollment, e.g. for authenticating a payment transaction by fingerprint through the host device, which may be connected to a payment network. Such an embodiment is shown in FIG. 15.

Figure 16:
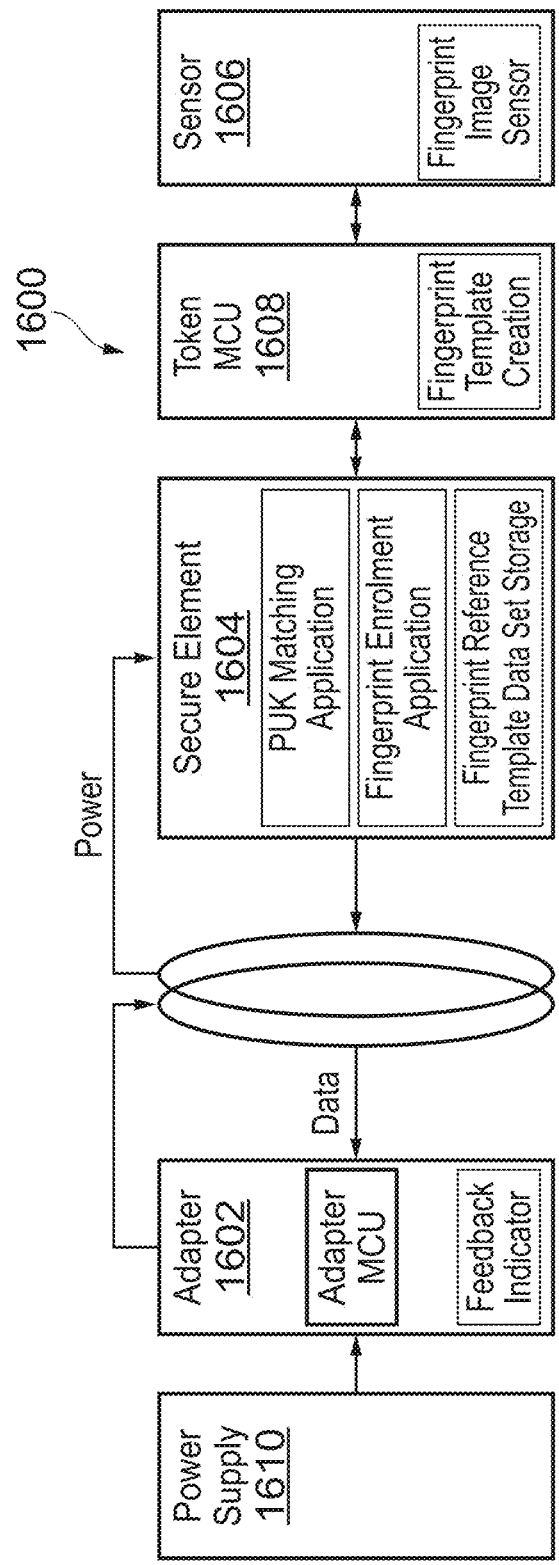
FIG. 16 shows a further illustrative embodiment of a user authentication system.

FIG. 16 shows a further illustrative embodiment of a user authentication system 1600. In other embodiments, the adapter 1602 may be configured to communicate with the token by a contactless ISO 14443 interface. To support contactless communication, a transmitter coil may be embedded between the bottom layer and the card layer and the antenna terminals may be connected to a conducting interface, which may enable operational coupling of the antenna terminals to the adapter 1602 when it is positioned in the locked position. In this embodiment, the adapter MCU may also be configured to encode and decode communication according to ISO 14443.

In other embodiments, capturing of a fingerprint and generation of at least one reference template data set member may be initiated by the token MCU itself without involvement of the secure element. In this case, a public key may be derived from the PUK and the at least one reference template data set member being generated may be encrypted by the public key and stored persistently inside the token MCU. Upon next access to a payment network, the token MCU may signal to the secure element that at least one new reference template data set member may be available. The secure element may collect the at least one encrypted reference template data set member from the token MCU and may decrypt them by a private key being derived from the same PUK. Using this approach, at least one reference template data set member may be stored in the insecure memory of the token MCU. Only if public and private key match the at least one reference template data set member may be added to the reference template data set inside the secure element; from that perspective the reference template information stored inside the insecure memory of the token MCU may not be utilized by unauthorized third parties who are not in possession of the private key. Such a private key should be securely stored inside the secure element. For these embodiments, a simplified version of the token interface may be sufficient, which may only provide optical feedback to the token fixture. For signaling status feedback to the cardholder, the token MCU may utilize the powerline to control an optical indicator inside the token interface adapter. This method may avoid additional communication lines between the token and the token interface adapter, thus saving cost.

Figure 17:
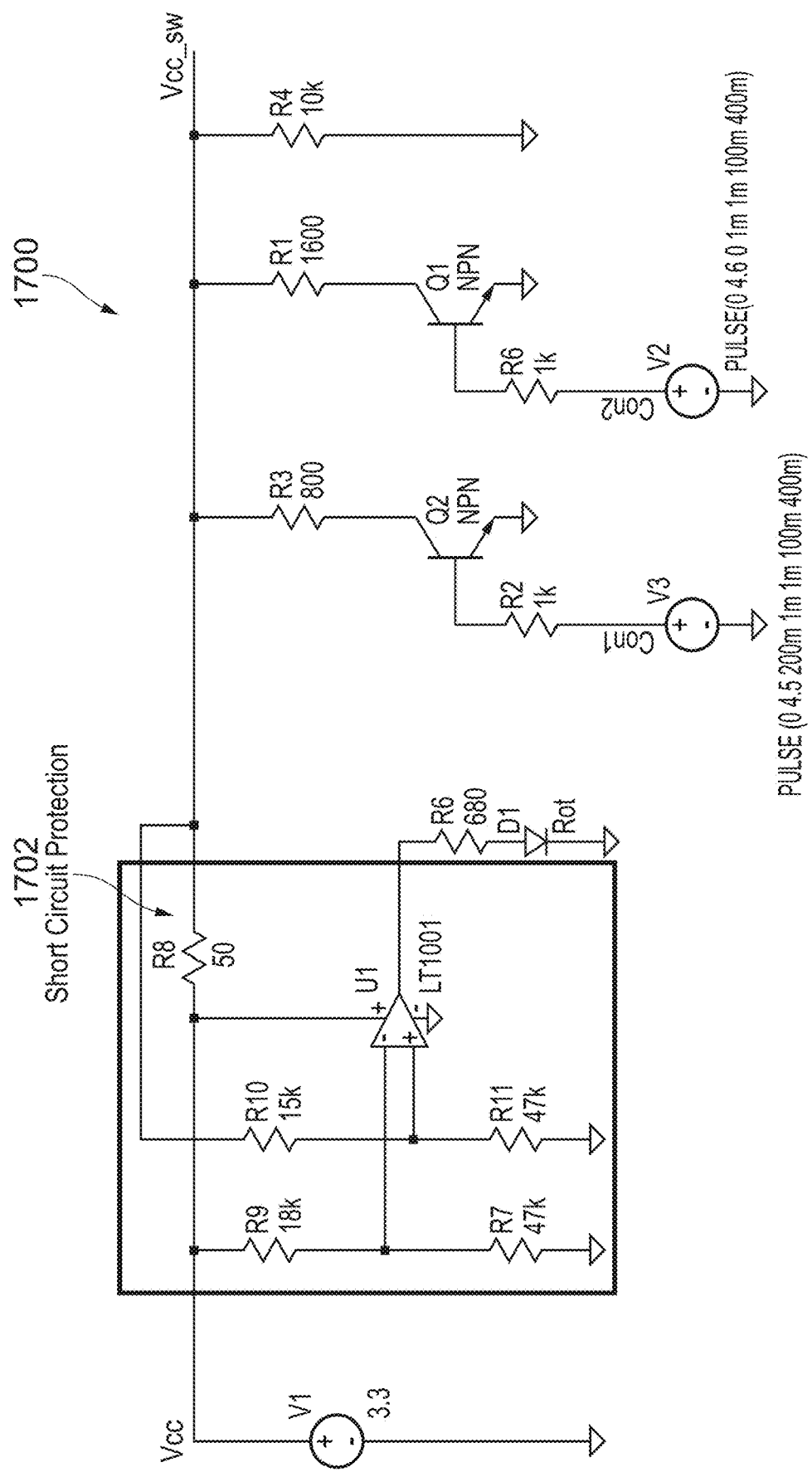
FIG. 17 shows an illustrative embodiment of a current sensor.

FIG. 17 shows an illustrative embodiment of a current sensor 1700. To control the optical indicator, the token MCU may stimulate two conditions: in the first condition, the token MCU may stimulate a total token supply current that may be deliberately set to a minimum below the minimal operational supply current, in the second condition the token MCU may stimulate a token supply current that may be set above the maximum operational supply current of the token. For achieving the first condition, a parallel load may be activated during all token activities with involvement of the token MCU. To stimulate the first condition, said parallel load is detached. To stimulate the second condition, the token MCU may increase its own supply current. Increasing the supply current may be achieved without a need for external components by e.g. increasing the clock frequency or activating otherwise unused peripheral components that are known to require significant extra current as e.g. ADCs or a PLL. A current sensor in the adapter interface may sense both conditions. This may be achieved by a current sensor as shown in FIG. 17. Such a current sensor may work as follows: over a series resistor, which may be a short-circuit protection resistor 1702, a voltage drop may develop if the token interface adapter may be operationally coupled to the token. Such voltage drop may be indicative for the current drawn by the token. A voltage comparator may be utilized to compare a fraction of the supply voltage versus a fraction of the difference of the supply voltage and said voltage drop. Said voltage comparator may be configured to activate a LED if e.g. the voltage drop exceeds a level being predefined by the components forming the input voltages for the voltage comparator.

Figure 18:
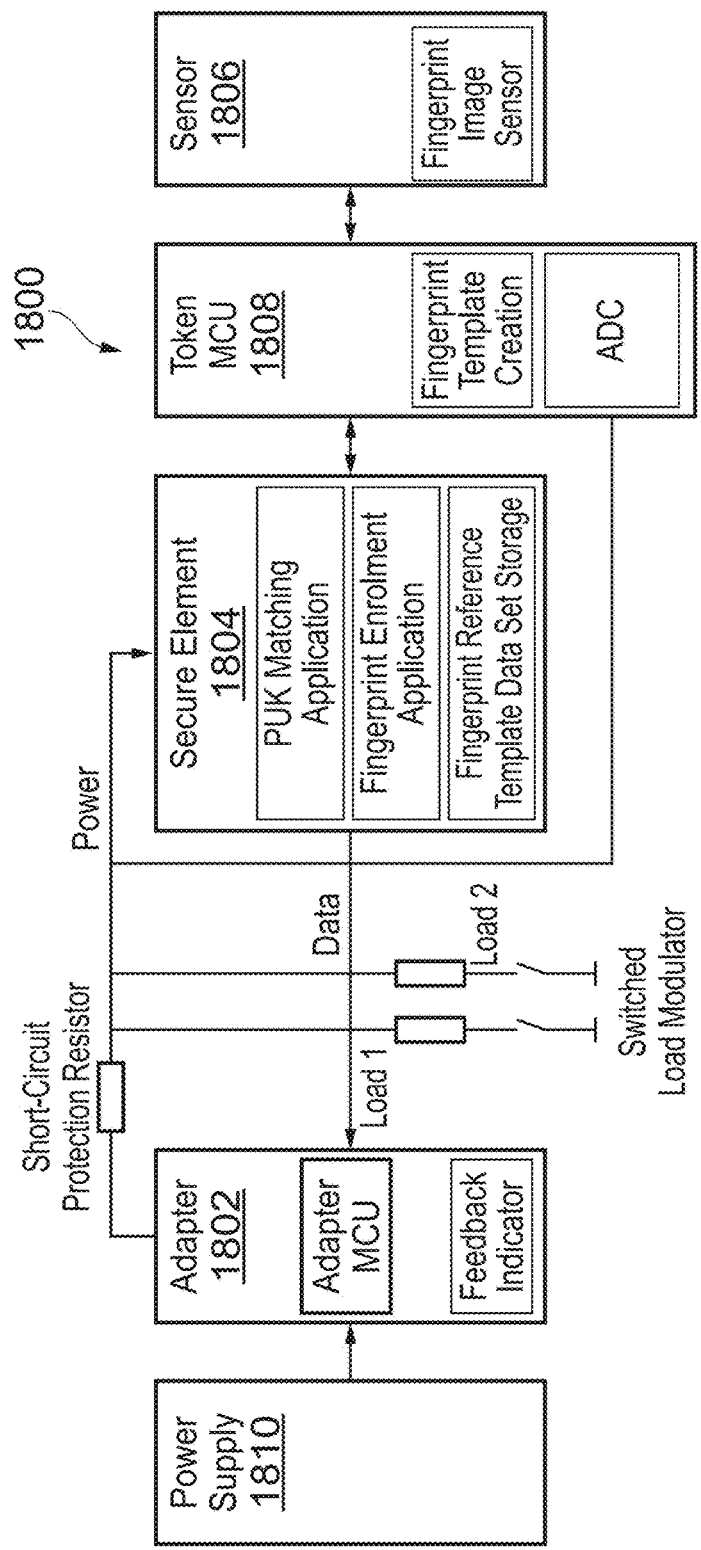
FIG. 18 shows a further illustrative embodiment of a user authentication system.

FIG. 18 shows a further illustrative embodiment of a user authentication system 1800. In other embodiments, a switch may be connected via a load resistor between a series resistor within the supply line and ground. The voltage-drop developing across said series resistor when switching the load resistor to ground may be measured by an Analog-to-Digital converter that may be integrated in the adapter MCU. Thus, a key-press at the adapter 1802 may be identified by the adapter MCU. This method may be applied to differentiate key presses on different switches switching different loads. The adapter MCU may be configured to measure the voltage without key presses upon adapter power-up. Applying relative switching levels to the measured supply voltage may enable the adapter MCU to convert relative switching levels into absolute voltage levels for sensing by its ADC. In other embodiments, the power supply may be a battery that is operationally coupled to the adapter PCB assembly. In other embodiments, the power supply is a solar panel that is operationally coupled to the adapter PCB assembly.

Figure 19:
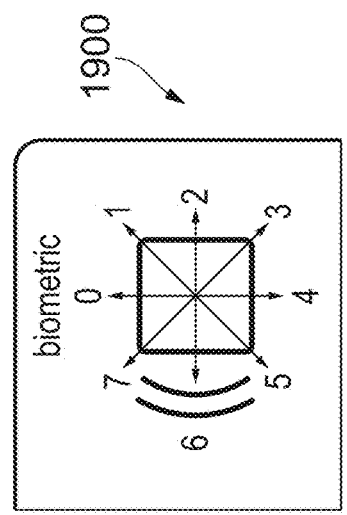
FIG. 19 shows an illustrative embodiment of a gesture-based PUK entry.

FIG. 19 shows an illustrative embodiment of a gesture-based PUK entry 1900. In some embodiments, the PUK information may be entered by capturing gestures being indicative of codes of a code alphabet of gestures. The size of a fingerprint sensor may allow the practical entry of a limited number of gestures that may e.g. comprise diagonal, vertical and horizontal movement over the sensor with a finger. These gestures may be processed into a machine-readable format, such that a sequence of gestures may be converted into a sequence or ordinal number that may be interpreted as a PUK to enable access to the enrollment process.

In some embodiments, the optical feedback indicators may be replaced by acoustical feedback indicators with the purpose of providing a token enrollment user interface to visually impaired people. In other embodiments, the optical feedback indicators may be replaced by tactile feedback indicators with the purpose of providing a token enrollment user interface to visually impaired people. In further embodiments, a fingerprint sensor may be beyond the enrollment use case utilized to decode a three-dimensional pattern, which is not a fingerprint, with the purpose of deriving a machine-readable code from it, which may be utilized as a personal key for gaining access to a service or a site. The code entropy of a 10×10 pixel pattern may theoretically be 2100 if differentiation of two states per code position is assumed. Such a pixel pattern may also be readable by low-resolution capacitive fingerprint sensors. In some embodiments, the 3-dimensional key is configured to comply with the requirement of an ultrasonic sensor which may require modifying the dimensions of the encoding pattern. In some embodiments, the 3-dimensional key may be configured to comply with the requirement of an infrared sensor which may require modifying the material of the substrate carrying the encoding pattern. In some embodiments, a reading device with an embedded fingerprint sensor may be utilized to sense a 3-dimensional code being embedded in the surface of a device, wherein the z-resolution of the third dimension enables a higher code density than what may currently be achieved by planar codes. Such 3-dimensional codes may be more difficult to read by unauthorized individuals.

Figure 20:
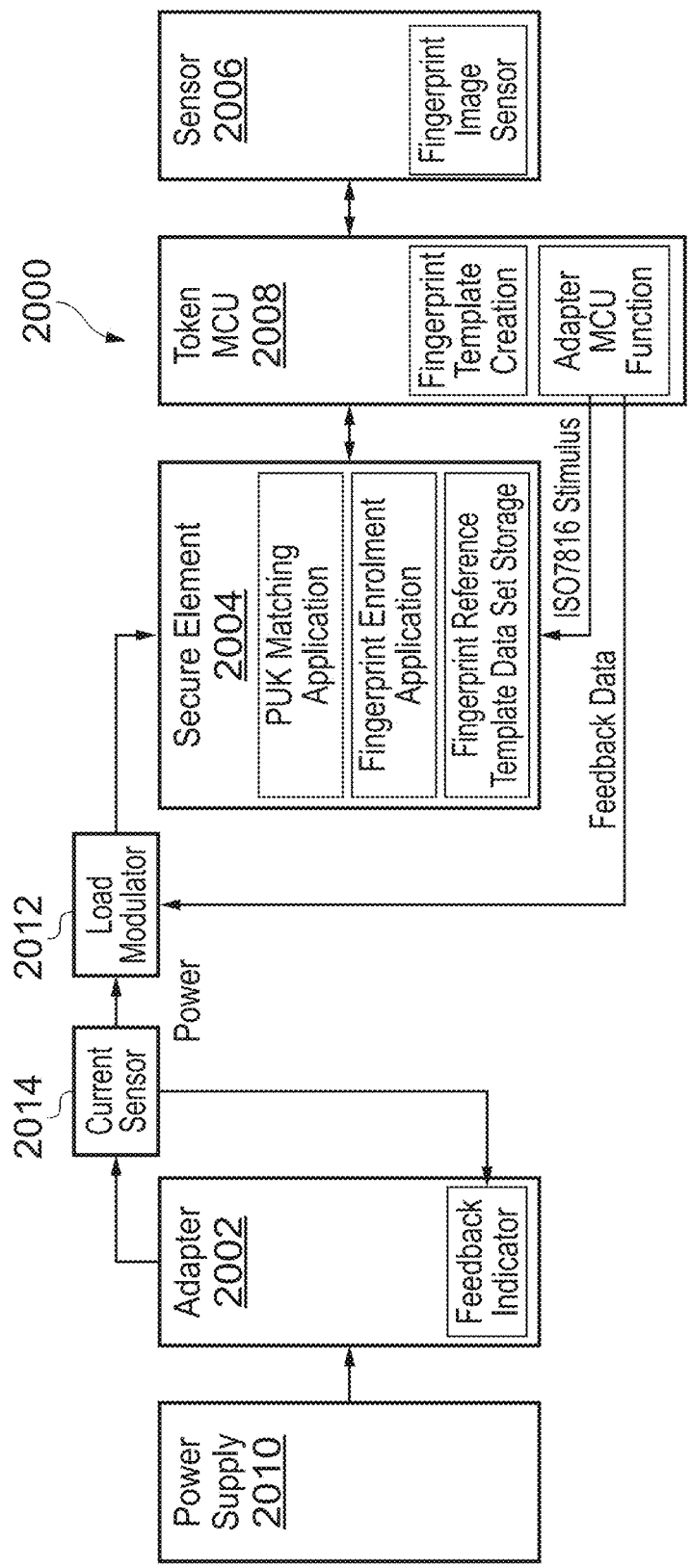
FIG. 20 shows a further illustrative embodiment of a user authentication system.

FIG. 20 shows a further illustrative embodiment of a user authentication system 2000. In some embodiments, the role of the adapter MCU may be carried out by the token MCU. For this purpose, the token MCU 2008 may provide an emulated ISO 7816 interface that may be operationally connected to the ISO 7816 interface of the secure element, when the token MCU 2008 may identify from the signal levels on the token's 7816 interface that the token is not connected to an ISO 7816 host system. If operationally connected, the token MCU 2008 may act as the adapter MCU. In this function, it may provide a stimulating APDU sequence to the secure element to trigger PUK acquisition and later enrollment. In this configuration, no adapter MCU is required. For providing a minimalistic user interface, the current sensing method as described above may be applied to control suitable user feedback devices as disclosed before. Thus, extra cost for an adapter MCU may be saved and, moreover, the manufacturer of the token may safeguard that the required functionality of the adapter MCU as embedded in the token MCU 2008 may always match his requirements.

Figure 21:
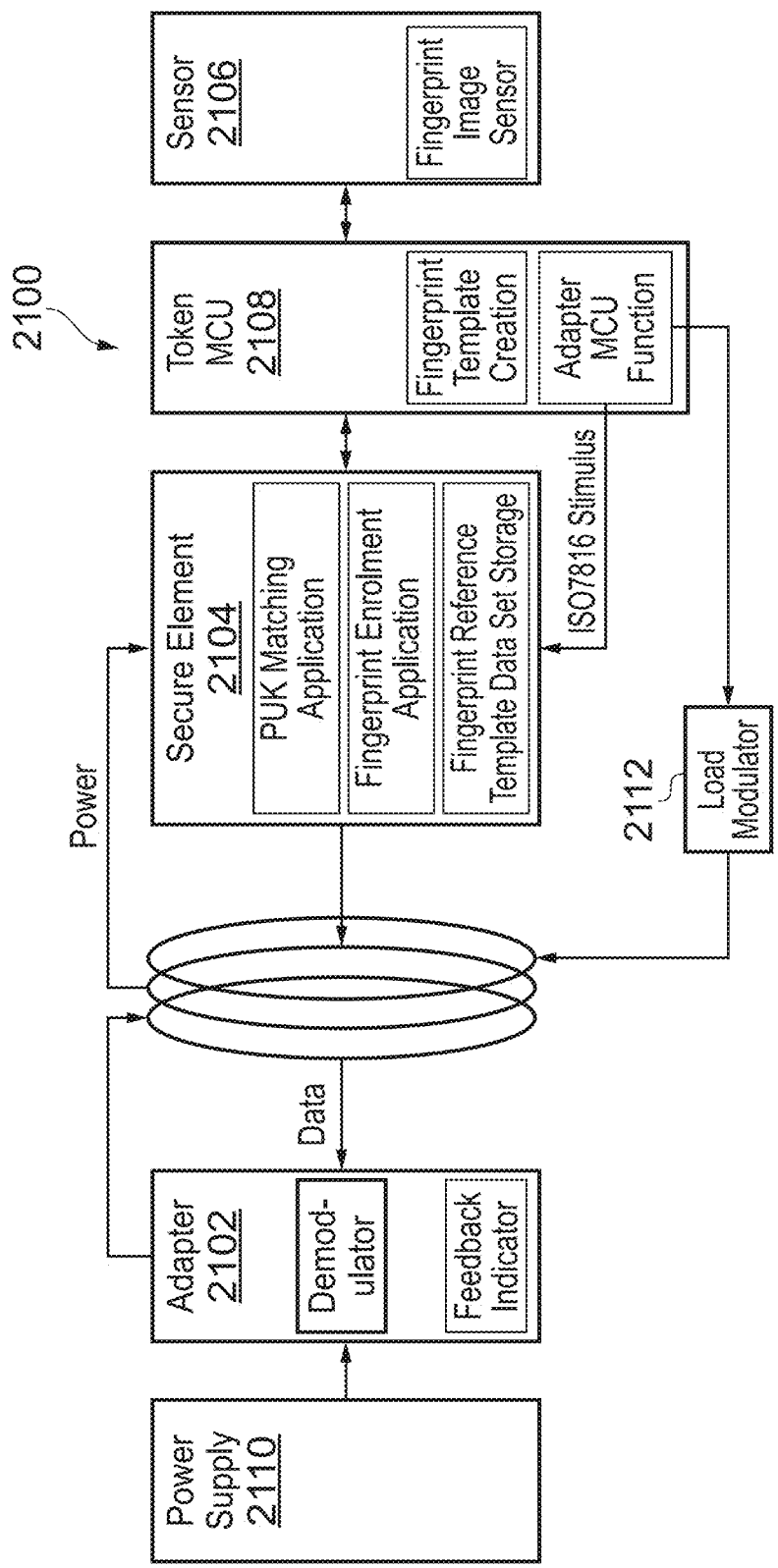
FIG. 21 shows a further illustrative embodiment of a user authentication system.

FIG. 21 shows a further illustrative embodiment of a user authentication system 2100. In some embodiments, when the token's secure element is set to communication through ISO 7816, the adapter 2102 may be configured to provide power to the token by means of a radio frequency (RF) field generated through a loop antenna that is operationally coupled to the adapter 2102 and, moreover, the role of the adapter MCU may be performed by the token MCU 2108. For this purpose, the token MCU 2108 may provide an emulated ISO 7816 interface that is operationally coupled to the ISO 7816 interface of the secure element, when the token MCU 2108 identifies from missing or unspecified signal levels on the token's 7816 interface that the token is not connected to an ISO 7816 host system. If operationally connected, the token MCU 2108 may act as the adapter MCU. In this function, it may provide a stimulating APDU sequence to the secure element to trigger PUK acquisition and later enrollment. In this configuration, no adapter MCU may be required. For providing a minimalistic user interface, load modulation of the RF field may be stimulated by the token MCU to signal activity of feedback indicators. The load modulation may be detected by the adapter 2102 by means of a demodulator and translated into control for feedback elements, thus virtually connecting the feedback elements contained in the adapter 2102 in a contactless manner to the token MCU 2108. Thus, extra cost for an adapter MCU may be saved and, moreover, the functionality of the adapter MCU as embedded in the token MCU 2108 may always match the requirements of the token type and version.

Figure 22:
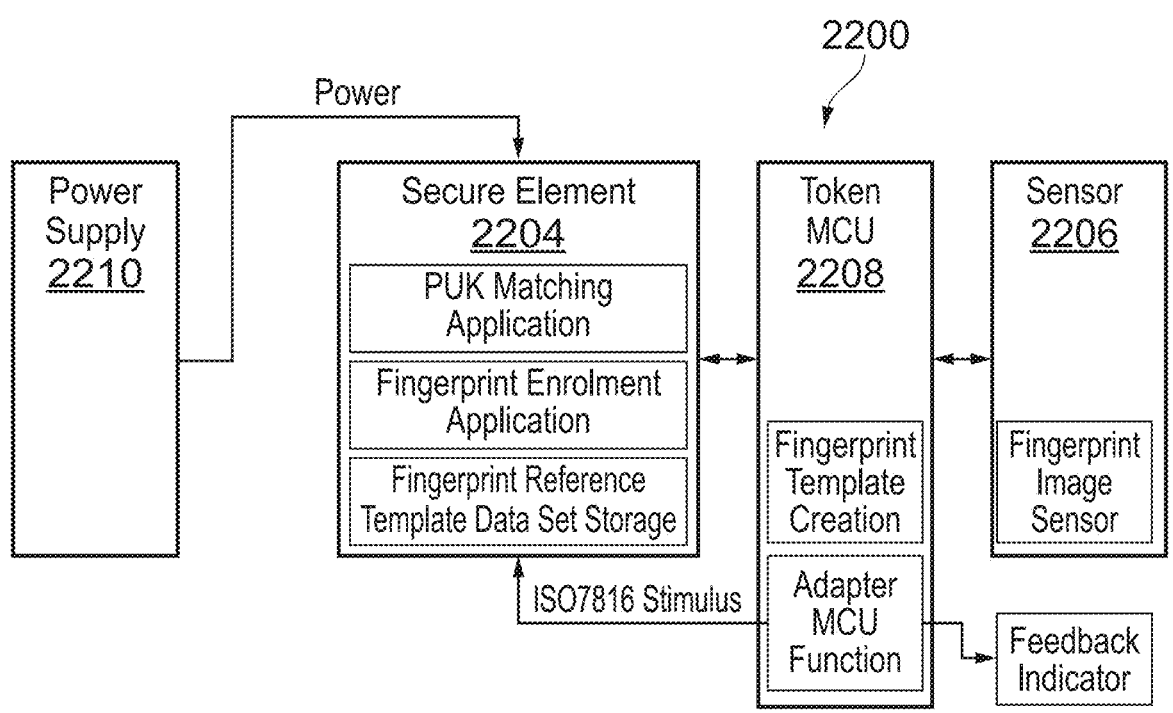
FIG. 22 shows a further illustrative embodiment of a user authentication system.

FIG. 22 shows a further illustrative embodiment of a user authentication system 2200. In some embodiments, the token or card itself may be equipped with user feedback indicators, and the token MCU 2208 may also fulfill the role of the adapter MCU as disclosed above. In these embodiments, only a power supply may be connected to the token's ISO 7816 interface. This approach may enable the implementation of a least cost self-enrollment interface. In such embodiments, the feedback indicators may be located near the sensor, as the sensor may always be exposed to the user.

In some embodiments, the adapter PCB may be configured such that it may show a flat topology (achieved e.g. by dam and fill over-molding), which may make it simpler to embed such a PCB assembly in the adapter housing while ensuring a fixed vertical position of the contact springs.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 user authentication system
102 user authentication token
104 secure element
106 fingerprint sensor
108 assistance device
200 method for enrolling fingerprint reference data in a user authentication token
202 coupling an assistance device to a user authentication token through an interface of said user authentication token
204 requesting, by the assistance device, a secure element to verify a personal unlock key to be captured by the secure element through a fingerprint sensor
206 capturing, by the secure element, the personal unlock key through the fingerprint sensor
208 verifying, by the secure element, the captured personal unlock key
210 enrolling, by the secure element, upon or after a positive verification of the personal unlock key, fingerprint reference data captured through the fingerprint sensor
300 token architecture
302 card MCU
304 secure element
306 sensor
308 card LDO
310 I²C interface
312 SPI interface
314 ISO/IEC 7816 interface
316 ISO/IEC 14443 interface
318 token architecture
320 smart card
322 ISO contact module
324 fingerprint verification module
326 loop antenna
400 token architecture
402 interface MCU
404 power
500 PUK entry and verification flow
502 adapter
504 secure element
506 biometric subsystem
508 sensor
600 fingerprint reference data enrollment flow
602 adapter
604 biometric smart card
700 user authentication system
702 adapter
704 secure element
706 sensor
708 token MCU
710 power supply
800 ISO/IEC 7816 interface implementation
802 adapter MCU
804 secure element
900 interface adapter PCB assembly
1000 card packaging sheets
1002 bottom layer
1004 card layer
1006 link layer
1008 top layer
1100 assembly steps
1102 token holder
1104 token holder with token
1106 link layer added
1108 top layer added
1110 adapter inserted
1112 adapter locked over contact plate
1114 3-D code with positioning adapter attached
1116 cross-section
1200 assembly steps
1202 bottom plate
1204 PCB housing
1206 PCB assembly
1208 PCB inserted
1210 top cover attached
1300 three-dimensional code pattern
1400 three-dimensional code pattern
1402 positioning plate
1404 positioning plate
1406 shipping letter
1500 user authentication system
1502 adapter
1504 secure element
1506 sensor
1508 token MCU
1510 host with USB interface
1600 user authentication system
1602 adapter
1604 secure element
1606 sensor
1608 token MCU
1610 power supply
1700 current sensor
1702 short-circuit protection
1800 user authentication system
1802 adapter
1804 secure element
1806 sensor
1808 token MCU
1810 power supply
1900 gesture-based PUK entry
2000 user authentication system
2002 adapter
2004 secure element
2006 sensor
2008 token MCU
2010 power supply
2012 load modulator
2014 current sensor
2100 user authentication system
2102 adapter
2104 secure element
2106 sensor
2108 token MCU
2110 power supply
2112 load modulator
2200 user authentication system
2202 feedback indicator
2204 secure element
2206 sensor
2208 token MCU
2210 power supply

The invention claimed is:

1. A user authentication system, comprising:
a user authentication token, said user authentication token comprising a fingerprint sensor and a secure element;
an assistance device configured to be coupled to the user authentication token through an interface of said user authentication token;
wherein the assistance device is configured to request the secure element to verify a personal unlock key to be captured by the secure element through the fingerprint sensor;
wherein the secure element is configured to capture the personal unlock key through the fingerprint sensor, to verify the captured personal unlock key and to enrol, upon or after a positive verification of the personal unlock key, fingerprint reference data captured through the fingerprint sensor;
wherein the assistance device includes a feedback circuit configured to guide a user through entry of the personal unlock key and fingerprint reference data enrolment process; and
wherein the interface includes a power line connection between the assistance device and the user authentication token, and the assistance device provides power to the user authentication token via the power line connection, and wherein the assistance device uses the power line connection to control the feedback circuit.

2. The system of claim 1, wherein the personal unlock key is a three-dimensional code pattern.

3. The system of claim 2, wherein the three-dimensional code pattern is a printable code pattern or a code pattern created by punching holes in a substrate.

4. The system of claim 2, wherein the three-dimensional code pattern is configured to be attached to or embedded in a document.

5. The system of claim 1, wherein at least a part of the personal unlock key comprises one or more gestures representing code elements of a known code alphabet.

6. The system of claim 1, wherein the interface is a contact-based interface according to the standard IS O/IEC 7816.

7. The system of claim 1, wherein the interface may include a contactless interface.

8. The system of claim 1, wherein the assistance device is further configured to facilitate fixing a position of the user authentication token.

9. The system of claim 1, wherein the assistance device is included in a delivery package that comprises the user authentication token.

10. The system of claim 9, wherein the assistance device is at least partially made of the same material as the delivery package.

11. The system of 1, wherein the feedback circuit is configured to provide optical feedback to a user, and wherein the optical feedback indicates task requests and provides feedback on task execution.

12. The system of claim 1, wherein the interface includes a load modulator to control the feedback circuit.

13. The system of claim 1, wherein the user authentication token is a smart card.

14. A method for enrolling fingerprint reference data in a user authentication token, wherein said user authentication token comprises a fingerprint sensor and a secure element, the method comprising:
coupling an assistance device to the user authentication token through an interface of said user authentication token;
requesting, by the assistance device, the secure element to verify a personal unlock key to be captured by the secure element through the fingerprint sensor;
capturing, by the secure element, the personal unlock key through the fingerprint sensor;
verifying, by the secure element, the captured personal unlock key;
enrolling, by the secure element, upon or after a positive verification of the personal unlock key, fingerprint reference data captured through the fingerprint sensor;
providing feedback to user authentication token using a feedback circuit of the assistance device, the feedback circuit configured to guide a user through entry of the personal unlock key and fingerprint reference data enrolment process;
providing power to the user authentication token from the assistance device via a power line connection of the interface; and
using the power line connection to control the feedback circuit.

15. The method of claim 14, wherein the method is implemented in a computer program stored in a non-transitory storage medium, the computer program comprising instructions that are executable by the assistance device or the secure element to cause said assistance device or secure element to carry out steps of the method.

* * * * *